United States Patent
Takigawa et al.

(10) Patent No.: US 7,346,265 B2
(45) Date of Patent: Mar. 18, 2008

(54) RECORDING/REPRODUCING APPARATUS, RECORDING/REPRODUCING METHOD, MEDIUM, AND PROGRAM

(75) Inventors: Shinichirou Takigawa, Kyoto (JP); Kazuhiro Mihara, Osaka (JP); Yoshiki Kuno, Osaka (JP); Junichi Komeno, Osaka (JP); Yoshitaka Yaguchi, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 873 days.

(21) Appl. No.: 10/415,605

(22) PCT Filed: Oct. 29, 2001

(86) PCT No.: PCT/JP01/09468
§ 371 (c)(1),
(2), (4) Date: Nov. 4, 2003

(87) PCT Pub. No.: WO02/37491
PCT Pub. Date: May 10, 2002

(65) Prior Publication Data
US 2004/0067047 A1    Apr. 8, 2004

(30) Foreign Application Priority Data
Oct. 31, 2000   (JP)   ............................. 2000-333317

(51) Int. Cl.
*H04N 5/91*   (2006.01)
(52) U.S. Cl. ........................................ 386/94
(58) Field of Classification Search .................. 386/94, 386/113, 100

See application file for complete search history.

(56) References Cited

U.S. PATENT DOCUMENTS

| 5,237,553 | A  |   | 8/1993 | Fukushima et al. |
| 6,118,924 | A  | * | 9/2000 | Nakatani et al. ............... 386/70 |
| 6,292,625 | B1 | * | 9/2001 | Gotoh et al. .................. 386/95 |
| 6,414,923 | B1 |   | 7/2002 | Park et al. |
| 6,564,345 | B1 |   | 5/2003 | Kim et al. |

(Continued)

FOREIGN PATENT DOCUMENTS

CN   1 227 950 A   9/1999

(Continued)

OTHER PUBLICATIONS

Supplementary European Search Report for Application No. EP 01 98 0928, dated Jun. 12, 2006.

(Continued)

*Primary Examiner*—Thai Q. Tran
*Assistant Examiner*—Anner Holder
(74) *Attorney, Agent, or Firm*—RatnerPrestia

(57) ABSTRACT

Continuous transfer of AV data without a break necessitates to perform replacement processing of a disk access unit and takes labor and time.

A characteristic is that an HDD is disposed which writes AV data in a recording medium, that an AV recording/reproducing controller is disposed which, when there is a write error in writing of AV data in a disk access unit which is a minimum unit for continuously accessing the recording medium, controls the HDD such that this disk access unit will be skipped and said AV data will be written in the next disk access unit, that skip processing judging means is disposed, and that a replacement area is not formed in the recording medium.

10 Claims, 15 Drawing Sheets

U.S. PATENT DOCUMENTS 6,810,441 B1 * 10/2004 Habuto et al. ................. 710/20
6,842,580 B1 *  1/2005 Ueda et al. ................. 386/125

FOREIGN PATENT DOCUMENTS

| EP | 866456      | 9/1998  |
| EP | 952573      | 10/1999 |
| JP | 62-099964   | 5/1987  |
| JP | 04-153957   | 5/1992  |
| JP | 11-39775    | 2/1999  |
| JP | 11-45158    | 2/1999  |
| JP | 11-176105   | 7/1999  |
| JP | 2000-3562   | 1/2000  |
| JP | 2000-076785 | 3/2000  |
| WO | WO 98/14938 | 4/1998  |

OTHER PUBLICATIONS

European Search Report for Application No. EP 01 98 0928, dated Mar. 14, 2006.

* cited by examiner

Fig. 15  PRIOR ART

| DAU NUMBER | POST-REPLACEMENT DAU NUMBER |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| ... | ... |

Fig. 16  PRIOR ART

| DAU NUMBER | TOP LBA |
|---|---|
| 1 | 1 |
| 2 | 4097 |
| 3 | 8193 |
| 4 | 12289 |
| 5 | 16385 |
| 6 | 20481 |
| 7 | 24577 |
| 8 | 28673 |
| 9 | 32769 |
| 10 | 36865 |
| ⋮ | ⋮ |

53 (table), 54 (DAU NUMBER), 55 (TOP LBA)

Fig. 17  PRIOR ART

| LBA | PHYSICAL ADDRESS |
|---|---|
| 0 | TRACK 1, SECTOR 1 |
| 1 | TRACK 1, SECTOR 2 |
| 2 | TRACK 1, SECTOR 3 |
| ⋮ | ⋮ |

RECORDING/REPRODUCING APPARATUS, RECORDING/REPRODUCING METHOD, MEDIUM, AND PROGRAM

This application is a U.S. national phase application of PCT international application PCT/JP01/09468.

TECHNICAL FIELD

The present invention relates to a recording and reproducing apparatus, a recording and reproducing method, a medium and a program for recording AV data.

BACKGROUND ART

The recent years with the proleferation of personal computers there has been widespread use of recording and reproducing apparatuses, such as hard disk drives and magneto-optic disk drives, for their large capacities and high speeds as external storage apparatus. As computer software of larger volumes are used and data to be handled is of large volume, the speeds and the capacities of these recording and reproducing apparatuses used as external storage apparatus have substantially increased.

In this manner, recording and reproducing apparatus which typically handle computer data is now also used with a digital AV apparatus for recording and reproducing video and audio data (hereinafter referred to as "AV data") making use of their large capacities and high speed.

When data, in a computer program are to be recorded in a recording and reproducing apparatus, an error of even one bit causes a serious problem such as a program malfunctions. Hence, recording and reproducing apparatus execute a strict error check at the time of recording and reproducing of computer data, to thereby guarantee the reliability of data, a program, etc.

Such error checks include (1) re-allocation processing of re-allocating an LBA (Logical Block Address) to a sector in a recording medium, (2) retry processing of recording in or reading from a sector in which there is an error, (3) replacement processing of allocating an LBA allocated to an error-bound sector to other sector within a replacement area and (4) suspending use of the error-bound sector, etc.

On the other hand, when AV data are to be recorded in a recording and reproducing apparatus, it is important while recording or reproducing to ensure that AV data will remain continuous so that the continuity of the AV data, rather than the reliability of the data, will be guaranteed.

In other words, when AV data are to be reproduced, if an error occurs in 1-byte data for instance, most of the audience will not notice when such AV data are displayed on a television monitor.

However, when a strict error check such as retry processing and replacement processing is executed during reproduction of the AV data, the reproduction of the AV data will be interrupted by the error check and images displayed on the television monitor will accordingly be chopped, which is very disturbing to the audience.

FIG. 13 shows a proposed recording and reproducing apparatus 40 which records and reproduces while guaranteeing the continuity of AV data.

The recording and reproducing apparatus 40 is comprised of an HDD 41, an AV recording/reproducing HDD controller 43, a replacement DAU table 42, a file system 4, a recording buffer 8 and a play buffer 9.

FIG. 14 shows a magnetic disk medium 44 which the HDD 41 writes and reads AV data in and from.

In the magnetic disk medium 44, there are an AV data recording area 47 and a replacement DAU area 46. In short, the AV data recording area 47 is an area for writing AV data in disk access units which are the minimum units for continuously accessing the magnetic disk medium 44, whereas the replacement DAU area 46 is an area in which a disk access unit is secured in advance which will be used to write AV data instead of a defective or otherwise inappropriate disk access unit within the AV data recording area 47 if it is not possible to write normally in the defective disk access unit. Thus, the recording and reproducing apparatus 40 executes replacement processing of a disk access unit of writing AV data in the disk access unit secured within the replacement DAU area 46 as a substitution for a disk access unit within the AV data recording area 47.

Further, when the sizes of the disk access units become small, the HDD 41 is sought for and forced on rotation stand-by frequently, and therefore, a transfer rate for AV data slows down. Noting this, the sizes of the disk access units are made large enough so as to guarantee continuous transfer of AV data, and set to 2 Mbytes for example.

HDD 41 holds a table in which a notified LBA (Logical Block Address) is associated with a track number and a sector number which express a physical location in the magnetic disk medium 44 as shown in FIG. 17, and serves as means which specifies a physical location in the magnetic disk medium 44 utilizing this table, and then writes or read AV data.

The AV recording/reproducing HDD controller 43 controls the HDD 41. The replacement DAU table 42 identifys a post-replacement disk access unit number from a pre-replacement disk access unit number.

FIG. 15 shows an example of the replacement DAU table 42. A DAU number 51 is the number assigned to a disk access unit as it is before replacement processing, while a post-replacement DAU number 52 is the number assigned to a disk access unit as it is after replacement processing. Without replacement processing performed, the same number in the DAU number 51 is stored as the post-replacement DAU number 52.

The file system 4 is for handling AV data as a file and serves as means which holds file information, which contains information regarding disk access units which form files, designates file name and refers to the file information or updates the file information.

In addition, a DAU converting table 53 is stored in the file system 4 as shown in FIG. 16. The DAU converting table 53 is a table for converting a disk access unit number 54 assigned to specify a disk access unit into an LBA 55 which is at the top of a disk access unit within the magnetic disk medium 44.

The recording buffer 8 is a buffer which, upon transfer of AV data to be written in the magnetic disk medium 44, temporarily stores the AV data.

The play buffer 9 is a buffer which temporarily stores AV data which were read from the magnetic disk medium 44.

Operations of such a recording and reproducing apparatus 40 will now be described.

First, the recording and reproducing apparatus 40 formats the magnetic disk medium 44, prior to recording or reproduction of AV data in or from the magnetic disk medium 44. At the time of the formatting processing, the replacement DAU area 46 is also ensured separately from the AV data recording area 47.

Next, replacement processing is performed which is for replacing a disk access unit which is defective or requires a predetermined period of time or longer time for writing or reading with a disk access unit which is within the replacement DAU area 46 so as to guarantee real-time transfer of AV data.

That is, writing in a disk access unit or reading from a disk access unit within the magnetic disk medium 44, the AV recording/reproducing HDD controller 43 identifies a disk access unit which is defective or requires a predetermined period of time or longer time for writing or reading.

When identifying such a disk access unit, the AV recording/reproducing HDD controller 43 notifies the file system 4 of this.

Upon notification, the file system 4 rewrites the replacement DAU table 42. In short, the post-replacement DAU number 52 which corresponds to the number assigned to the disk access unit thus notified about is rewritten into the number assigned to a disk access unit which is within the replacement DAU area 46.

The processing above will then be repeated for all disk access units which are within the replacement DAU area 46.

When replacement processing is performed in the units of sectors, since a seek action and rotation stand-by occur in a sector which is under the replacement processing, writing and reading take an extra amount of time. Hence, replacement processing at smaller intervals than a size which guarantees continuous transfer of AV data makes it impossible to guarantee continuous transfer of the AV data because of seek, rotation stand-by, etc. On the contrary, the recording and reproducing apparatus 40, executing replacement processing in the units of disk access units whose sizes guarantees continuous transfer of AV data, can guarantee the continuity of the AV data even at the time of replacement processing.

In this manner, the recording and reproducing apparatus 40 performs replacement processing in the units of disk access units in advance and therefore guarantees transfer of AV data in real time.

Recording of AV data in the magnetic disk medium 44 will now be described.

AV data received by a television tuner or the like are transferred to the recording and reproducing apparatus 40 in real time.

The recording buffer 8 temporarily records the AV data thus transferred in real time.

Storing the AV data amounting to a disk access unit, the recording buffer 8 notifies the AV recording/reproducing HDD controller 43 of that.

Notified by the recording buffer 8 of the storage of the AV data amounting to a disk access unit, the AV recording/reproducing HDD controller 43 demands the file system 4 to tell in which disk access unit the AV data will be written.

In response, the file system 4 checks, from the file information, the number assigned to a disk access unit in which AV data are to be written, and using the replacement DAU table 42 shown in FIG. 15, converts the disk access unit number 51 into the post-replacement DAU number 52. In the event that the disk access unit in which AV data are to be written has been replaced because of a defect or the like, the disk access unit number of the replacement DAU area 46 is written as the post-replacement DAU number 52. In the event that no replacement processing is performed, the number which is the same as the number assigned to the disk access unit in which AV data are to be written is written as the post-replacement DAU number 52. The number assigned to the replaced disk access unit is then reported to the AV recording/reproducing HDD controller 43. Hence, of the disk access units within the AV data recording area 47, a disk access unit which is defective or requires a predetermined period of time or longer time for writing or reading is not used.

Notified by the file system 4 of the number assigned to the replaced disk access unit to which AV data is written, the AV recording/reproducing HDD controller 43 demands for notification of the top LBA of thus notified disk access unit number.

Upon receipt of the demand from the AV recording/reproducing HDD controller 43, the file system 4 identifies the disk access unit number and the LBA at the top of the disk access unit denoted as the top LBA 55 while referring to the DAU converting table 53 which is shown in FIG. 16, and notifies the AV recording/reproducing HDD controller 43 of the same.

Further, the AV recording/reproducing HDD controller 43 demands the recording buffer 8 to transfer AV data to be written in one disk access unit.

In response, the recording buffer 8 transfers AV data to be written in one disk access unit to the AV recording/reproducing HDD controller 43.

The AV recording/reproducing HDD controller 43 designates, from the notified LBA, the number of sectors in which AV data are to be written, issues a write command to the file system 4, and transfers the AV data transferred from the recording buffer 8 to the HDD 41.

The file system 4 provides the HDD 41 with the write command sent from the AV recording/reproducing HDD controller 43.

The HDD 41 converts the notified LBA into a track number and a sector number with reference to the table which is shown in FIG. 17, and writes the transferred AV data in a sector which forms a corresponding track which is in the magnetic disk medium 44.

Meanwhile, AV data are transferred to the recording buffer 8 in real time, and the recording buffer 8, upon storing the AV data amounting to a disk access unit, notifies the AV recording/reproducing HDD controller 43 of that. Operations similar to the above will then be repeated, thereby recording the AV data transferred in real time. This prevents use of a disk access unit which will not see a termination of recording of AV data even after a predetermined period of time or longer time due to a defect or the like, and therefore, it is possible to guarantee real-time transfer of AV data.

Reading of AV data from the magnetic disk medium 44 will now be described.

The play buffer 9 outputs AV data in real time, and when a free space is created which amounts to a disk access unit, notifies the AV recording/reproducing HDD controller 43 of that.

Notified from the play buffer 9, the AV recording/reproducing HDD controller 43 demands the file system 4 for the number assigned to a disk access unit which is to be read out next.

In response, the file system 4 checks from the file information the number assigned to a disk access unit in which AV data are to be written, and converts the disk access unit number 51 into the post-replacement DAU number 52 with reference to the replacement DAU table 42. Hence, a defective disk access unit will not be used. The AV recording/reproducing HDD controller 43 is then notified of the number assigned to a replaced disk access unit.

When notified by the file system 4 of the number assigned to the disk access unit in which AV data are to be written, the AV recording/reproducing HDD controller 43 makes an inquiry regarding the top LBA of the disk access unit thus reported to the file system 4.

Receiving the inquiry from the AV recording/reproducing HDD controller 43, the file system 4 notifies the AV recording/reproducing HDD controller 43 of the top LBA of the disk access unit.

The AV recording/reproducing HDD controller 43, upon notification by the file system 4 of the notified LBA, designates the LBA and the number of sectors in which the AV data are to be read out and issues a read command to the file system 4.

The file system 4 relays the read command sent from the AV recording/reproducing HDD controller 43 to the HDD 41.

The HDD 41 converts the notified LBA into a track number and a sector number with reference to the table which is shown in FIG. 17, and reads the AV data from the sectors which form a corresponding track which is in the magnetic disk medium 44 and transfers to the AV recording/reproducing HDD controller 43.

The AV recording/reproducing HDD controller 43 transfers thus read AV data to the play buffer 9.

The play buffer 9 stores the AV data read by the AV recording/reproducing HDD controller 43 and outputs stored AV data in real time.

Hence, since the sizes of the disk access units are made large enough so as to continuously transfer AV data, and further, since a disk access unit which is within the replacement DAU area 46 is used instead of a defective disk access unit, the recording and reproducing apparatus 40 guarantees continuous transfer of the AV data.

However, requiring to execute replacement processing of a disk access unit in advance in order to guarantee continuous transfer of AV data, the conventional recording and reproducing apparatus 40 needs labor and time.

That is, it is necessary to execute replacement processing of a disk access unit for the purpose of continuously transferring AV data, which gives rise to a problem that it takes labor and time (first problem).

Further, at the time of replacement processing, reading and writing are executed in the entire magnetic disk medium 44 in order to find a defect in a disk access unit or a disk access unit which requires a predetermined period of time or longer time for writing or reading, and hence, AV data already recorded in the magnetic disk medium 44 get deleted.

In other words, there is a problem (second problem) that replacement processing of a disk access unit executed for the purpose of continuously transferring AV data causes deletion of AV data which were previously recorded in a recording medium.

In addition, for execution of replacement processing of a disk access unit, it is necessary to secure a disk access unit in the magnetic disk medium 44 which will serve as a substitute like the replacement DAU area 46. Because of this, an area such as the AV data recording area 47 in which a user-can freely record AV data decreases.

That is, there is a problem (third problem) that for execution of replacement processing of a disk access unit for the purpose of guaranteeing continuous transfer of AV data without a break, it is necessary to secure in advance a disk access unit which will serve as a substitute, and hence, as compared with where replacement processing is not carried out, an area which a user can freely use decreases.

Further, in the event that there is disturbance such as vibrations, even though there is not a defect in a disk access unit within the magnetic disk medium 44, the disk access unit will be determined defective. Until re-formatting, the disk access unit will be treated as a defective disk access unit.

That is, there is a problem (fourth problem) that when there is disturbance such as vibrations, even a disk access unit having no defect is determined as a defective disk access unit and will be treated as a defective disk access unit until the recording medium has been formatted.

DISCLOSURE OF THE INVENTION

Considering the first problem described above, the present invention aims at providing a recording and reproducing apparatus, a recording and reproducing method, a medium and a program with which it is possible to continuously transfer AV data without a break without taking labor and time.

Further, considering the second problem described above, the present invention aims at providing a recording and reproducing apparatus, a recording and reproducing method, a medium and a program with which it is possible to continuously transfer AV data without a break without deleting AV data already recorded in a recording medium.

Further, considering the third problem described above, the present invention aims at providing a recording and reproducing apparatus, a recording and reproducing method, a medium and a program with which it is possible to continuously transfer AV data without a break without decreasing an area which a user can freely use.

Further, considering the fourth problem described above, the present invention aims at providing a recording and reproducing apparatus, a recording and reproducing method, a medium and a program with which it is possible to avoid permanently treating a defect-free disk access unit as a defective disk access unit due to disturbance such as vibrations and to accordingly re-use such a defect-free disk access unit.

To solve the above problems, a first aspect of the present invention is a recording and reproducing apparatus, comprising:

recording means which writes AV data in or reads AV data from a recording medium; and recording control means which, when there is a write error in writing of AV data in a disk access unit which is a minimum unit for continuously accessing said recording medium, controls said recording means such that this disk access unit will be skipped and said AV data will be written in the next disk access unit, wherein a replacement area which corresponds to said disk access unit in which there is said error is not formed in said recording medium.

A second aspect of the present invention is the recording and reproducing apparatus of the first aspect of the present invention, comprising error judging means which makes a judgment regarding whether said write error has occurred, wherein said recording control means controls said recording means based on said judgment.

A third aspect of the present invention is the recording and reproducing apparatus of the second aspect of the present invention, wherein said error judging means makes a judgment regarding whether there is a read error in reading of AV data from said disk access unit, and when there is a read error in reading of AV data in said disk access unit, said recording control means controls said recording means based on said judgment such that this disk access unit will be skipped and AV data will be read from the next disk access unit.

A fourth aspect of the present invention is the recording and reproducing apparatus of the second or the third aspect of the present invention, wherein said error judging means judges that said write error or said read error has occurred when a command error occurs.

A fifth aspect of the present invention is the recording and reproducing apparatus of the second or the third aspect of the present invention, wherein said error judging means judges that said write error or said read error has occurred when even after a timer over period derived from the continuity of AV data has passed, writing or reading of said AV data in said disk access unit fails to complete.

A sixth aspect of the present invention is the recording and reproducing apparatus of the fifth aspect of the present invention, wherein when writing or reading of said AV data in said disk access unit fails to complete even after said timer over period, said recording control means forcibly terminates a command issued to said recording means and accordingly controls such that said disk access unit will be skipped.

A seventh aspect of the present invention is the recording and reproducing apparatus of the first aspect of the present invention, comprising a write skip counter which counts the number of times that said disk access unit is skipped, wherein said recording control means controls such that when said number of times exceeds a predetermined value which is equal to or larger than 1, this disk access unit will not be used after this.

An eighth aspect of the present invention is the recording and reproducing apparatus of the seventh aspect of the present invention, wherein the number of times counted by said write skip counter is not initialized unless said recording medium is formatted.

A ninth aspect of the present invention is the recording and reproducing apparatus of the first aspect of the present invention, comprising a read protection flag which expresses whether to prohibit reading from said disk access unit, wherein when said read protection flag which corresponds to said disk access unit is ON, said recording control means controls such that reading from this disk access unit will not be executed, but controls such that reading from this disk access unit will be executed when said read protection flag which corresponds to said disk access unit is OFF.

A tenth aspect of the present invention is the recording and reproducing apparatus of the ninth aspect of the present invention, wherein when said write error has occurred during writing of said AV data in said disk access unit, said recording control means turns on said read protection flag which Corresponds to said disk access unit.

An eleventh aspect of the present invention is the recording and reproducing apparatus of the ninth aspect of the present invention, comprising a read skip counter which counts the number of times that a read error has occurred during reading of said AV data from said disk access unit, wherein when said number of times exceeds a predetermined value, said recording control means turns on said read protection flag which corresponds to said disk access unit.

A twelfth aspect of the present invention is the recording and reproducing apparatus of the eleventh aspect of the present invention, wherein when writing of said AV data in said disk access unit has ended normally, said recording control means turns off said read protection flag which corresponds to said disk access unit, and the value of said read skip counter which corresponds to said disk access unit is initialized to zero.

A thirteenth aspect of the present invention is the recording and reproducing apparatus of the eleventh aspect of the present invention, wherein when said AV data recorded in said disk access unit are deleted, said recording control means turns off said read protection flag which corresponds to said disk access unit, and the value of said read skip counter which corresponds to said disk access unit is initialized.

A fourteenth aspect of the present invention is a recording and reproducing method, comprising:

a recording step of writing AV data in or reading AV data from a recording medium; and a recording control step of, when there is a write error in writing of AV data in a disk access unit which is a minimum unit for continuously accessing said recording medium, controlling said recording step such that this disk access unit will be skipped and said AV data will be written in the next disk access unit, wherein a replacement area which corresponds to said disk access unit in which there is said error is not formed in said recording medium.

A fifteenth aspect of the present invention is the recording and reproducing method of the fourteenth aspect of the present invention, comprising an error judging step of making a judgment regarding whether said write error has occurred, wherein said recording control step controls said recording step based on said judgment.

A sixteenth aspect of the present invention is the recording and reproducing method of the fifteenth aspect of the present invention, wherein said error judging step makes a judgment regarding whether there is a read error in reading of AV data from said disk access unit is judged, and when there is a read error in reading of AV data in said disk access unit, said recording control step controls said recording means based on said judgment such that this disk access unit will be skipped and AV data will be read from the next disk access unit.

A seventeenth aspect of the present invention is the recording and reproducing method of the fifteenth or the sixteenth aspect of the present invention, wherein said error judging step judges that said write error or said read error has occurred when a command error occurs.

An eighteenth aspect of the present invention is the recording and reproducing method of the fifteenth or the sixteenth aspect of the present invention, wherein said error judging step judges that said write error or said read error has occurred when even after a timer over period derived from the continuity of AV data has passed, writing or reading of said AV data in said disk access unit fails to complete.

A nineteenth aspect of the present invention is a medium which can be processed on a computer and which stores a program for making a computer function as all or some of: recording means of the recording and reproducing apparatus of claim 1 which writes AV data in or reads AV data from a recording medium; and recording control means of the recording and reproducing apparatus of the first aspect of the present invention which controls said recording means which, when there is a write error in writing of AV data in a disk access unit which is a minimum unit for continuously accessing said recording medium, controls said recording means such that this disk access unit will be skipped and said AV data will be written in the next disk access unit.

A twentieth aspect of the present invention is a program for making a computer function as all or some of: recording means of the recording and reproducing apparatus of the first aspect of the present invention which writes AV data in or reads AV data from a recording medium; and recording control means of the recording and reproducing apparatus of the first invention of the present invention which controls said recording means which, when there is a write error in writing of AV data in a disk access unit which is a minimum unit for continuously accessing said recording medium, controls said recording means such that this disk access unit will be skipped and said AV data will be written in the next disk access unit.

BRIEF DESCRIPTION OF THE DRAWINGS

FIG. 14 is a drawing which shows an example of a magnetic disk medium which the conventional recording and reproducing apparatus records in and reproduces from;

FIG. 15 is a drawing which shows an example of a replacement DAU table of the conventional recording and reproducing apparatus;

FIG. 16 is a drawing which shows an example of a DAU conversion table which is used by the conventional recording and reproducing apparatus and the recording and reproducing apparatuses according to the embodiments; and FIG. 17 is a drawing which shows a table which associates an LBA with a physical address, which is used by the conventional recording and reproducing apparatus and the recording and reproducing apparatuses according to the embodiments.

Figure 1:
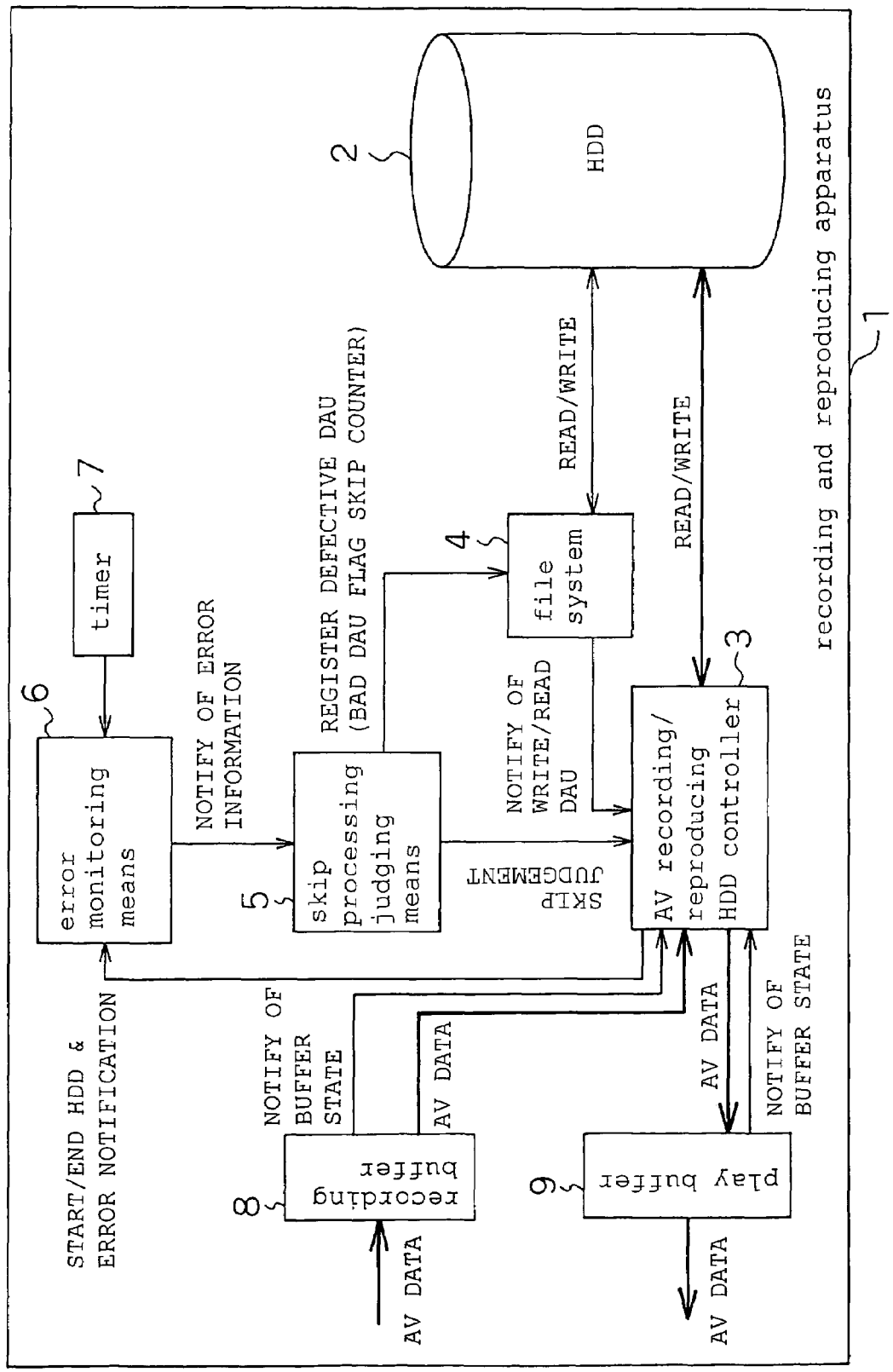
FIG. 1 is a drawing which shows a structure of a recording and reproducing apparatus according to a first embodiment of the present invention.

1 recording and reproducing apparatus
2 HDD
3 AV recording/reproducing HDD controller
4 file system
5 skip processing judging means
6 error monitoring means
7 timer
8 recording buffer
9 play buffer
11 recording and reproducing apparatus
12 DVD RAM drive
13 AV recording/reproducing DVD controller
14 recording and reproducing apparatus
15 MO drive
16 AV recording/reproducing MO controller
17 recording and reproducing apparatus
18 AV recording/reproducing HDD controller
20 magnetic disk medium
22 usable defective DAU
23 unusable defective DAU
26 AV data recording area
27 magnetic disk medium

BEST MODE FOR IMPLEMENTING THE INVENTION

With reference to the associated drawings, embodiments will now be described which are the best mode for implementing the present invention.

FIRST EMBODIMENT

First, a first embodiment will now be described.

FIG. 1 shows a recording and reproducing apparatus 1 according to this embodiment.

The recording and reproducing apparatus 1 comprises and HDD2, an AV recording/reproducing HDD controller 3, a file system 4, skip processing judging means 5, error monitoring means 6, a timer 7, a recording buffer 8 and a play buffer 9.

The HDD 2 is, as shown in FIG. 17, means which stores or associating a notified LBA (Logical Block Address) with a track number and a sector number expressing a physical location in a magnetic disk medium in a similar manner that according to the conventional technique, and associates an LBA with a track number and a sector number in a magnetic disk medium while utilizing this table and writes AV data in or reads AV data from the magnetic disk medium.

Figure 5:
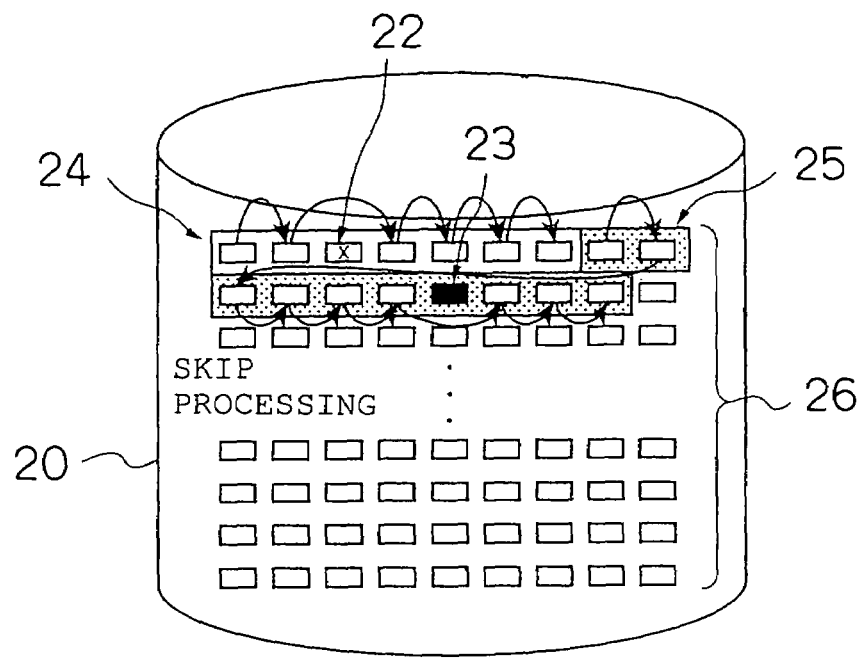
FIG. 5 is a drawing which shows an example of a magnetic disk medium according to the first embodiment of the present invention.

FIG. 5 shows a magnetic disk medium 20 which the HDD 2 writes AV data in or reads AV data from. Unlike the magnetic disk medium 44 described in relation to the conventional technique, the magnetic disk medium 20 does not include a replacement DAU area 46.

The AV recording/reproducing HDD controller 3 is means which controls the HDD 2.

The file system 4 is means which manages files, disk access units and the like while using a DAU conversion table which is for identifying an LBA located at the top of a disk access unit from file information, which is information regarding files recorded in the HDD 2, information regarding the respective disk access units in the magnetic disk medium 20 and the numbers assigned to the disk access units.

The file information herein referred to is information expressing, from a file name, in which disk access units and in which order AV data are written, and permitting for instance to associate a file name to the numbers assigned to the disk access units which form the corresponding file and list up the numbers assigned to the disk access units in the order in which the AV data are written.

Meanwhile, the information regarding the respective disk access units in the magnetic disk medium 20 includes a write skip counter which counts the number of times that writing in every disk access unit has been skipped, a read skip counter which counts the number of times that reading from disk access unit has been skipped, a bad DAU flag which indicates that AV data will not be read out from a disk access unit during reading, etc.

FIG. 16 shows a DAU converting table 53. The DAU converting table 53 is a table is for converting a disk access unit number 54 assigned to specify a disk access unit into an LBA 55 which is at the top of a disk access unit within the magnetic disk medium 44.

The skip processing judging means 5 is means which judges whether to skip a disk access unit during writing or reading.

The error monitoring means 6 is means which monitors whether a write or read error has occurred while writing in or reading from a disk access unit is ongoing.

The timer 7 is means which measures a period of time during which writing in or reading from a disk access unit is ongoing.

The recording buffer 8 is a buffer which temporarily stores AV data when the AV data to be written in the HDD 2 are transferred to the recording buffer 8.

The play buffer 9 is a buffer which temporarily stores AV data read out from the HDD 2.

The HDD 2 according to this embodiment is an example of recording means of the present invention, the magnetic disk medium 20 according to this embodiment is an example of a recording medium of the present invention, the AV recording/reproducing HDD controller 3 and the skip processing judging means 5 according to this embodiment are an example of recording control means of the present invention, the error monitoring means 6 according to this embodiment is an example of error monitoring means of the present invention, the bad DAU flag according to this embodiment is an example of a read protection flag, and the error monitoring means 6 according to this embodiment is an example of reading-out error monitoring means of the present invention.

Operations of such a recording and reproducing apparatus 1 will now be described. First, a description will be given on operations for a situation that AV data are to be recorded in the magnetic disk medium 20 within the HDD 2.

Upon formatting of the magnetic disk medium 20, the write skip counter and the read skip counter of each disk access unit described above are both initialized to zero and the bad DAU flag is set to OFF. The bad DAU flag being OFF means that AV data are to be read out from a corresponding disk access unit, while the bad DAU flag being ON means that AV data are not to be read out from the disk access unit.

The file information which the file system 4 uses for management of the files, the information regarding the disk access units and the DAU converting table 53, are stored in the magnetic disk medium 20. When the recording and reproducing apparatus 1 is started up, the file system 4 loads the file information, the information regarding the disk access units and the DAU converting table 53 into a memory of the file system 4 from the magnetic disk medium 20.

AV data received by a television tuner or the like are transferred to the recording and reproducing apparatus 1 in real time.

The recording buffer 8 temporarily stores the AV data thus transferred in real time. Storing the AV data amounting to a disk access unit, the recording buffer 8 notifies the AV recording/reproducing HDD controller 3 of the storage of the AV data amounting to a disk access unit.

Notified by the recording buffer 8 of the storage of the AV data amounting to a disk access unit, the AV recording/reproducing HDD controller 3 demands the file system 4 to tell which disk access unit the AV data will be written.

In response, the file system 4 notifies the AV recording/reproducing HDD controller 3 of the number assigned to the disk access unit in which AV data are to be written from the file information.

Notified by the file system 4 of the number assigned to the disk access unit in which AV data are to be written, the AV recording/reproducing HDD controller 3 makes an inquiry regarding the top LBA of the number assigned to the disk access unit thus notified about to the file system 4.

Receiving the inquiry from the AV recording/reproducing HDD controller 3, the file system 4 obtains the LBA at the top of the disk access unit denoted as the top LBA 55 according to the disk access unit number, using the DAU converting table 53 which is shown in FIG. 16, and notifies the AV recording/reproducing HDD controller 3 of the same.

Further, the AV recording/reproducing HDD controller 3 demands the recording buffer 8 to transfer AV data which are to be written in one disk access unit.

In response, the recording buffer 8 transfers AV data to be written in one disk access unit to the AV recording/reproducing HDD controller 3.

The AV recording/reproducing HDD controller 3 transfers to the HDD2 the AV data thus transferred from the recording buffer 8, designates the LBA 55 at the top of the disk access unit and a write size which is the size of one disk access unit and issues a write command to the file system 4. The file system 4 relays the write command sent from the AV recording/reproducing HDD controller 3 to the HDD 2.

The HDD 2 converts the notified LBA into a track number and a sector number with reference to the table which is shown in FIG. 17, and writes the transferred AV data in a corresponding sector within the magnetic disk medium 44.

Meanwhile, AV data are transferred to the recording buffer 8 in real time, and the recording buffer 8, upon storing the AV data amounting to a disk access unit, notifies the AV recording/reproducing HDD controller 3 of that again. The recording and reproducing apparatus 1 repeats operations similar to those described above, thereby sequentially recording AV data which are transferred in real time in each disk access unit.

As described above, for recording of AV data, the error monitoring means 6 monitors whether a write command issued by the AV recording/reproducing HDD controller 3 is executed normally or an error has occurred, and accordingly detects a defective disk access unit.

Figure 7:
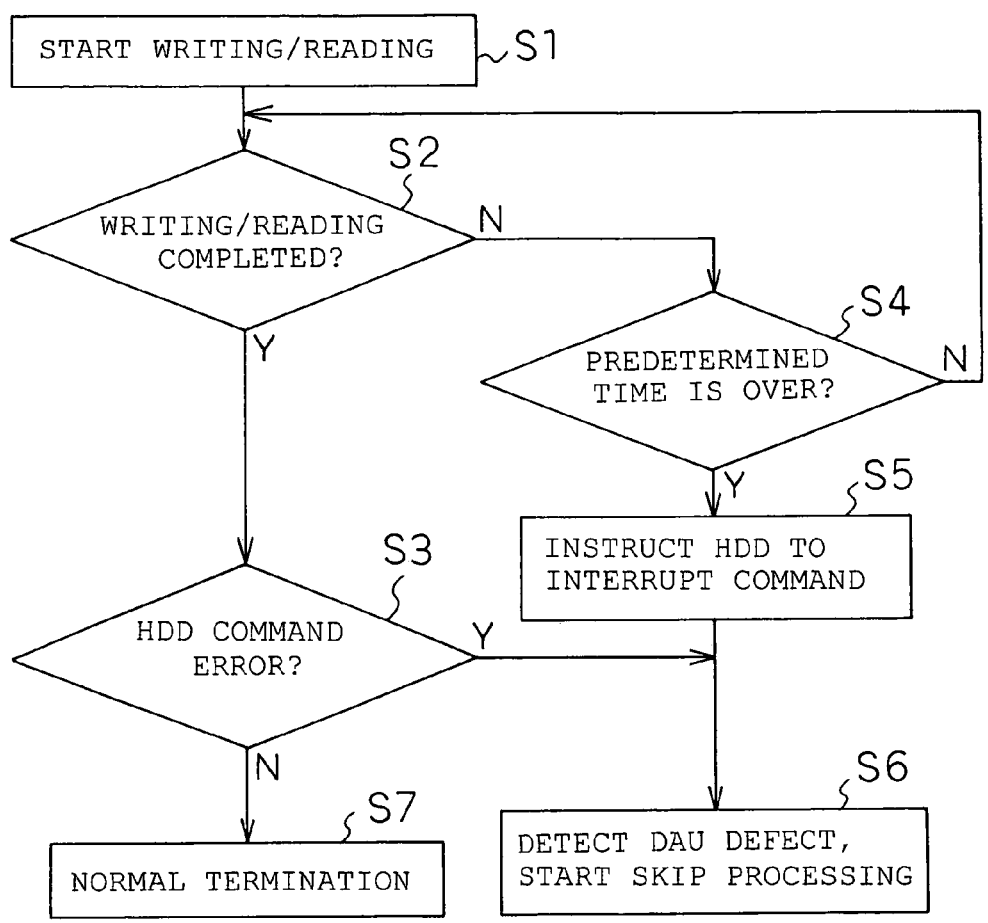
FIG. 7 is a flow chart which shows operations of error monitoring means according to the first embodiment of the present invention.

FIG. 7 shows operations of the error monitoring means 6. The operations of the error monitoring means 6 will now be described with reference to FIG. 7.

When the AV recording/reproducing HDD controller 3 issues a write command in the manner described above (S1) the error monitoring means 6 starts error monitoring. In other words, using the timer 7, an elapsed time since the issuance of the write command by the AV recording/reproducing HDD controller 3 is measured.

The error monitoring means 6 determines whether a notification of end of write command has been sent from the HDD 2 (S2). When the notification of end of write command is yet to be received from the HDD 2, the error monitoring means 6 proceeds to S4, but to S3 when the notification of end of write command has been sent from the HDD 2.

At S4, the error monitoring means 6 determines whether an elapsed time since the issuance of the write command is 300 msec or longer. The period of time 300 msec is a time over period which is yielded from the continuity of AV data. That is, in the event that writing in one disk access unit ends in 300 msec or shorter time, it is possible to guarantee the continuity of AV data which are to be written. A method of deriving the timer over period will be described later. When it is 300 msec or more since the issuance of the write command, the error monitoring means 6 proceeds to S5, but to S2 when it is 300 msec or less.

In the event that an elapsed time of 300 msec or more has elapsed since the issuance of the write command, the error monitoring means 6 at S5 instructs the AV recording/reproducing HDD controller 3 to interrupt the writing. Provided with the instruction from the error monitoring means 6, the AV recording/reproducing HDD controller 3 issues a write interrupt command to the file system 4, and the file system 4 relays the write interrupt command to the HDD 2. Receiving the write interrupt command, the HDD 2 interrupts the writing and proceeds to S6.

At S6, the error monitoring means 6 notifies the skip processing judging means 5 of detection of a defective disk access unit. The skip processing judging means 5, notified by the error monitoring means 6 of detection of a defective DAU, starts up skip processing. The skip processing will be described later.

Meanwhile, at S3, when notifying of the end of the write command, the HDD 2 notifies whether the write command was ended normally or because of an error. Upon receipt of the notification of end of write command from the HDD 2, the error monitoring means 6 judges whether the write command was ended normally or because of an error.

When the write command was ended because of an error, the error monitoring means 6 proceeds to S6, but to S7 when the write command was ended normally.

In short, at S6, in the event that the write command was ended because of an error or in the event that the write command was not ended even after 300 msec, the error monitoring means 6 determines that the disk access unit in which writing of the AV data was tried is a defective disk access unit, on the basis that a write error has occurred.

At S7, in the event that the write command was ended normally, the error monitoring means 6 notifies the skip processing judging means 5 of a normal termination of the write command, and the AV recording/reproducing HDD controller 3 issues the next write command when notified by the recording buffer 8 of storage of AV data amounting to the next disk access unit.

Figure 8:
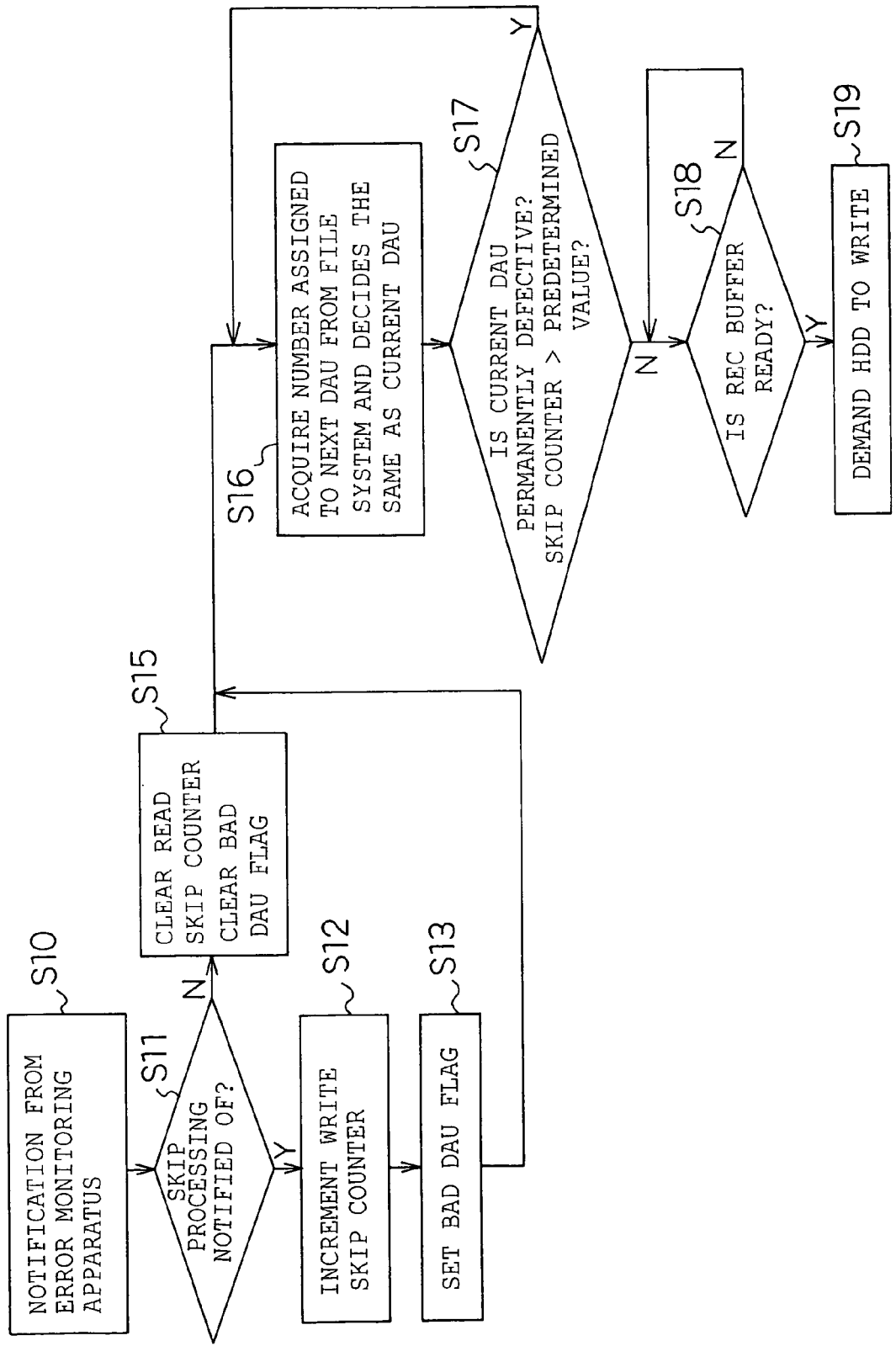
FIG. 8 is a flow chart which shows operations of skip processing judging means during recording according to the first embodiment of the present invention.

Operations of the skip processing judging means 5 will now be described. FIG. 8 shows operations of the skip processing judging means 5.

At S10, when notified by the error monitoring means 6, the skip processing judging means 5 judges whether this notification is a notification of a normal termination of a write command or a notification of detection of a defective disk access unit (S11).

When the notification is a notification of detection of a defective disk access unit, the skip processing judging means 5 proceeds to S12, but to S15 when the notification is a notification of a normal termination of the write command.

At S15, the skip processing judging means 5, notified of a normal termination of the write command, initializes a write skip flag of a corresponding disk access unit to zero, turns off a bad DAU flag, and proceeds to S16.

On the contrary, at S12, the skip processing judging means 5, notified by the error monitoring means 6 of detection of a defective disk access unit, increments the write skip counter of the disk access unit only by 1.

After turning on the bad DAU flag of the disk access unit (S13), the skip processing judging means 5 proceeds to S16.

At S16, the skip processing judging means 5 acquires the number assigned to a disk access unit which needs be written next from the file system 4, treats this as a current disk access unit and proceeds to S17.

At S17, the skip processing judging means 5 determines whether the current disk access unit is permanently defective. That is, the skip processing judging means 5 recognizes a permanent defect when the value of the write skip counter of the current disk access unit is over 5, but does not recognize a permanent defect when the value is 5 or smaller. A permanently defective disk access unit refers to such a disk access unit in which it is not possible to write or read normally not because of disturbance such as vibrations but because of a defect of the disk access unit itself.

A method of judging a permanent defect will now be described. Causes of a write error and a read error in the recording and reproducing apparatus 1 include an error attributed to a defect in a disk, an error attributed to a random error, an error attributed to disturbance such as vibrations, etc.

Of these, an error attributed to a defect in a disk is an error associated with a defect in a disk access unit of the magnetic disk medium 20 within the HDD 2, which always occurs during reading from a defective disk access unit and also during writing in a similar fashion. On the other hand, an error attributed to a random error is an error which occurs because of a random access to a disk access unit, and a probability of an error attributed to a random error is as small as about $10^{-12}$. An error attributed to disturbance such as vibrations and the like occurs differently in different environments of use but at an empirical probability of about $10^{-9}$ in normal installment in a household.

A permanently defective disk access unit is a disk access unit in which there is a defect of the disk access unit itself as described earlier, and every time such a disk access unit is written in or read, an error occurs. Hence, when a probability of an error occurring during writing in or reading from a certain disk access unit is higher than a probability of an error attributed to a random error and a probability of an error attributed to disturbance such as vibrations, etc., it is possible to determine that this disk access unit is a permanently defective disk access unit. When a probability of an error occurring during writing or reading is larger than 10−9, therefore, it is possible to determine that this disk access unit is a permanently defective disk access unit.

To be more specific, in a condition that a user's usage is use of the recording and reproducing apparatus 1 for five years, the magnetic disk medium 20 of the HDD 2 has a capacity of 30 Gbytes, the size of disk access units of the magnetic disk medium 20 is 1 Mbyte and recording of 24 Mbps of data is continued for eight hours a day, one disk access unit is written twice a day on the average. Hence, during five years, on the average, one disk access unit is written 2×365×5 =3650 times. During writing over 3650 times in a certain disk access unit, therefore, the frequency of an error other than a defect of the disk is barely one time. In short, an error attributed to disturbance such as vibrations occurs about only once in five years in one disk access unit, while an error attributed to a random error occurs about only once in ten years.

Hence, in this model, as for detection of a permanent error, it is possible to judge that errors occurring twice is an error attributed to a defect of the disk. In other words, in this model, a permanent defect is recognized when the value of the write skip counter of the current disk access unit is over 1 while a permanent defect is not recognized when the value is equal to or smaller than 1, thereby judging whether the disk access unit is permanently defective. In this manner, it is possible to judge whether a disk access unit is permanently defective by recognizing a permanent defect when the value of the skip counter is beyond a predetermined value (which is 1 in this model) while not recognizing a permanent defect when the value is equal to or smaller than the predetermined value. Further, since a judgment regarding an error attributed to a defect of the disk is different depending on the condition of use and an error characteristic of a medium, it is necessary to determine the predetermined value which is used for recognition of a permanent defect in advance in accordance with applications. At S17, 5 is used as such a predetermined value, considering that some disk access units of the magnetic disk medium 20 within the HDD 2 could be more frequently written in or read than other disk access units.

When the current disk access unit is permanently defective at S17, the skip processing judging means 5 proceeds to S16. When the current disk access unit is not permanently defective, the skip processing judging means 5 notifies the AV recording/reproducing HDD controller 3 of the number assigned to the disk access unit to be skipped and proceeds to S18. That is, the disk access unit judged permanently defective will not be used after this.

For example, in the magnetic disk medium 20 shown in FIG. 5, a usable defective DAU 22 is one for which the value of the write skip counter is 5 or smaller, and writing in such a disk access unit is executed. However, an usable defective DAU 23 is one for which the value of the write skip counter is over 5, and writing in such a disk access unit is not executed.

At S18, the AV recording/reproducing HDD controller 3 is notified by the recording buffer 8 of storage of AV data which are to be written in the next disk access unit and amount to a disk access unit, and the AV recording/reproducing HDD controller 3 skips a disk access unit of which the skip processing judging means 5 notified to skip, acquires the number assigned to the disk access unit which needs be written in next from the file system 4 and proceeds to S19.

At S19, the AV recording/reproducing HDD controller 3 issues a write command which is for writing in the next disk access unit to the HDD 2 via the file system 4.

In this manner, the recording and reproducing apparatus 1 writes AV data in the disk access units of the magnetic disk medium 20 one after another.

As described above, the recording and reproducing apparatus 1 according to this embodiment increments the write skip counter of an error-bound disk access unit only by 1, and turns on the bad DAU flag. AV data are then written in the disk access unit which needs be written after this disk access unit. A disk access unit for which the value of the write skip counter is over 5 is regarded permanently defective, and will not be written with AV data.

The bad DAU flag of a disk access unit is turned off when writing in the disk access unit succeeds even once, and the read skip counter is zeroed. In this case, the write skip counter is left as it is.

Hence, unlike according to the conventional technique, the recording and reproducing apparatus 1 according to this embodiment is capable of continuously transferring AV data without executing replacement processing. Further, it is possible to re-use a disk access unit in which writing fails to complete in 300 msec or more because of disturbance or the like.

Operations for a situation that the recording and reproducing apparatus 1 reproduces AV data which are recorded in the magnetic disk medium 20 will now be described.

Assume that AV data which have been already recorded in the magnetic disk medium 20 in the manner described above. As the recording and reproducing apparatus 1 starts up, the file system 4 loads in the file information, information regarding disk access units and the DAU converting table 53 into a memory of the file system 4 from the magnetic disk medium 20.

The AV recording/reproducing HDD controller 3 makes an inquiry on the number assigned to a disk access unit which needs be read next from the file system 4.

In response, the file system 4 notifies the AV recording/reproducing HDD controller 3 of the number assigned to a disk access unit for which AV data are to be read from the file information.

Notified by the file system 4 of the number assigned to the disk access unit for which AV data are to be read, the AV recording/reproducing HDD controller 3 makes an inquiry on an LBA at the top of the disk access unit.

The file system 4, receiving the inquiry from the AV recording/reproducing HDD controller 3, obtains the LBA at the top of the disk access unit denoted as the top LBA 55 according to the disk access unit number, using the DAU converting table 53 which is shown in FIG. 16, and notifies the AV recording/reproducing HDD controller 3 of the same.

Notified of the LBA, the AV recording/reproducing HDD controller 3 designates the LBA and the number of sectors which amount to the size of the disk access unit and issues a read command to the file system 4, and the file system 4 relays thus sent read command to the HDD 2.

The HDD 2 converts the notified LBA into a track number and a sector number with reference to the table which is shown in FIG. 17, reads AV data from sectors which form a corresponding track of the magnetic disk medium 44, and transfers to the AV recording/reproducing HDD controller 3.

The AV recording/reproducing HDD controller 3 transfers thus read AV data to the play buffer 9.

The play buffer 9 stores the AV data transferred from the AV recording/reproducing HDD controller 3, and outputs stored AV data in real time.

When a free space amounting to one disk access unit is created within the play buffer 9, the AV recording/reproducing HDD controller 3 is notified of that.

At the timing of the notification from the play buffer 9 of the free space amounting to a disk access unit, the AV recording/reproducing HDD controller 3 issues a read command to the file system 4. Operations similar to those described above will be then repeated, thereby reading the AV data one after another.

As described above, for reading of AV data, the error monitoring means 6 monitors whether a read command issued by the AV recording/reproducing HDD controller 3 is executed normally or an error has occurred, and accordingly detects a defective disk access unit.

That is, FIG. 7 shows operations of the error monitoring means 6. The operations of the error monitoring means 6 will now be described with reference to FIG. 7.

When the AV recording/reproducing HDD controller 3 issues a read command in the manner described above (S1), the error monitoring means 6 starts error monitoring. In other words, using the timer 7, an elapsed time since the issuance of the read command by the AV recording/reproducing HDD controller 3 is measured.

The error monitoring means 6 determines whether a notification of end of read command has been sent from the HDD 2 (S2). When the notification of end of read command is yet to be received from the HDD 2, the error monitoring means 6 proceeds to S4, but to S3 when the notification of end of read command has been sent from the HDD 2.

At S4, the error monitoring means 6 determines whether an elapsed time since the issuance of the read command is 300 msec or more. The time 300 msec is a time over period which is yielded from the continuity of AV data. That is, in the event that reading ends in 300 msec or shorter time, it is possible to continuously reproduce AV data without a break. A method of deriving the timer over period will be described later. When it is 300 msec or more since the issuance of the read command, the error monitoring means 6 proceeds to S5, but to S2 when it is 300 msec or shorter.

In the event that an elapsed time of 300 msec or more has elapsed since the issuance of the read command, the error monitoring means 6 at S5 instructs the AV recording/reproducing HDD controller 3 to interrupt the reading. Provided with the instruction from the error monitoring means 6, the AV recording/reproducing HDD controller 3 issues a read interrupt command to the file system 4, and the file system 4 relays the read interrupt command to the HDD 2. Receiving the read interrupt command, the HDD 2 interrupts the reading and proceeds to S6.

At S6, the error monitoring means 6 notifies the skip processing judging means 5 of detection of a defective disk access unit. The skip processing judging means 5, notified by the error monitoring means 6 of detection of a defective DAU, starts up skip processing. The skip processing will be described later.

Meanwhile, at S3, when notifying of the end of the read command, the HDD 2 also notifies whether the read command was ended normally or because of an error. Upon receipt of the notification of end of read command from the HDD 2, the error monitoring means 6 judges whether the read command was ended normally or because of an error. The error monitoring means 6 proceeds to S6 after an error-induced termination, but to S7 after a normal termination.

When the read command was ended because of an error, or when the read command failed to end even after 300 msec or more, the error monitoring means 6 decides at S6 that a read error has occurred, and judges that the disk access unit from which reading of the AV data was tried is a defective disk access unit.

At S7, in the event that the read command was ended normally, the error monitoring means 6 notifies the skip processing judging means 5 of a normal termination of the read command, and the AV recording/reproducing HDD controller 3 transfers AV data to the play buffer 9 and issues the next read command when notified of outputting of AV data amounting to a disk access unit from the play buffer 9.

Figure 9:
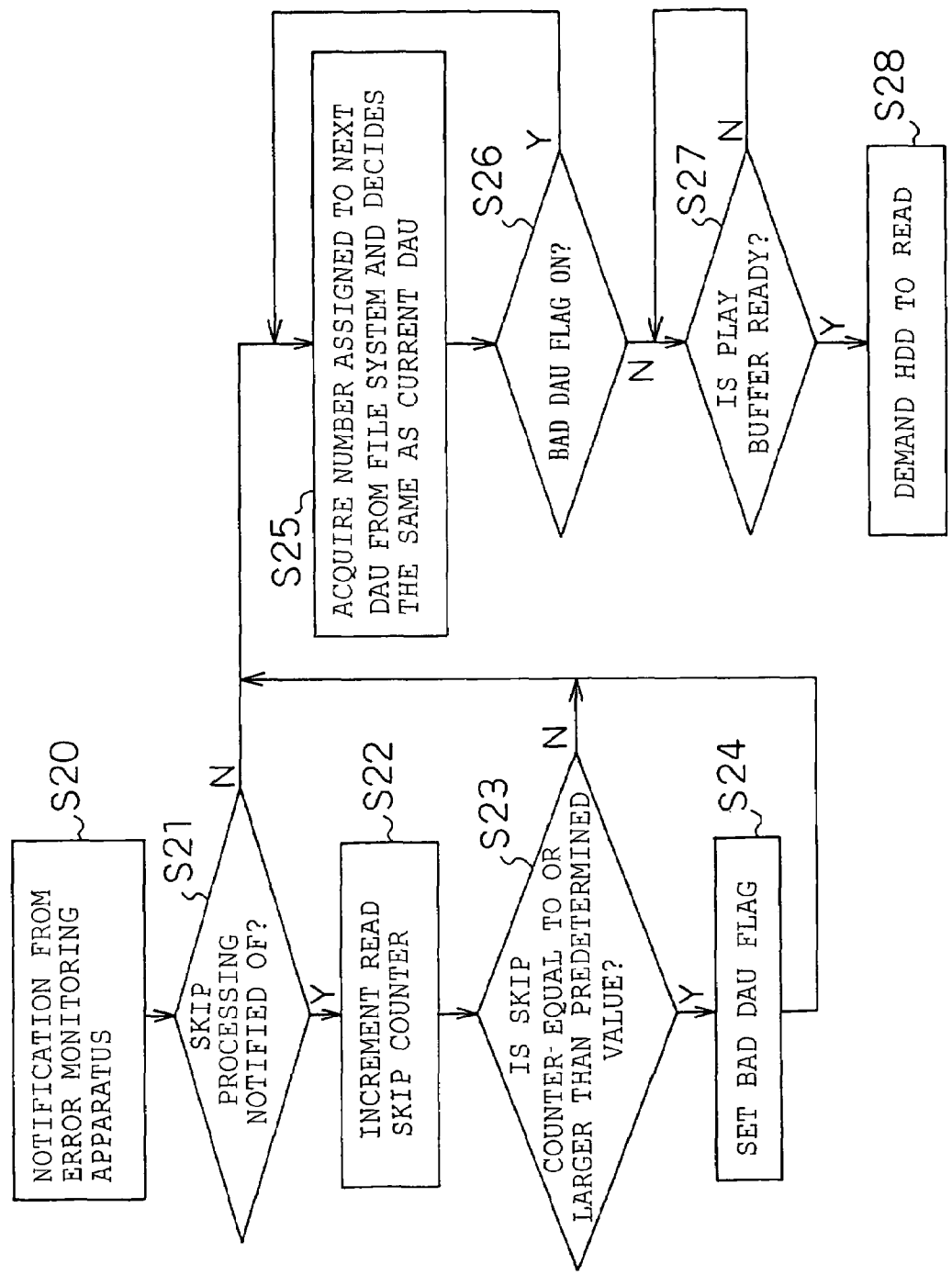
FIG. 9 is a flow chart which shows operations of the skip processing judging means during reproduction according to the first embodiment of the present invention.

Operations of the skip processing judging means 5 will now be described. FIG. 9 shows operations of the skip processing judging means 5.

At S20, when notified by the error monitoring means 6, the skip processing judging means 5 judges whether this notification is a notification of a normal termination of a read command or a notification of detection of a defective disk access unit (S21).

When the notification is a notification of a normal termination of a read command, the skip processing judging means 5 proceeds to S25, but to S22 when the notification is a notification of detection of a defective disk access unit At S22, the skip processing judging means 5, notified by the error monitoring means 6 of detection of a defective disk access unit, increments the read skip counter of this disk access unit only by 1 and proceeds to S23.

At S23, the skip processing judging means 5 judges whether the value of the read skip counter is over 5. The skip processing judging means 5 proceeds to S24 when the value is over 5, but to S25 when the value is equal to or smaller than 5.

At S24, the skip processing judging means 5 turns on the bad DAU flag of this disk access unit and proceeds to S25.

At S25, the skip processing judging means 5 acquires the number assigned to the disk access unit which needs be read next from the file system 4, decides that this is the current disk access unit, and proceeds to S26.

At S26, the skip processing judging means 5 judges whether the bad DAU flag of the current disk access unit is ON or OFF. That is, when the bad DAU flag of the current disk access unit is ON, the skip processing judging means 5 proceeds to S25. Meanwhile, when the bad DAU flag of the current disk access unit is OFF, the skip processing judging means 5 notifies the AV recording/reproducing HDD controller 3 of the number assigned to the disk access unit whose bad DAU flag is ON, and proceeds to S27.

At S27, notified of outputting of AV data amounting to a disk access unit from the play buffer 9 and generation of a free space amounting to one disk access unit within the play buffer 9, the AV recording/reproducing HDD controller 3 skips the disk access unit which is covered by the notification from the skip processing judging means 5, acquires the number assigned to the disk access unit which needs be written next from the file system 4, and proceeds to S28.

At S28, the AV recording/reproducing HDD controller 3 issues a read command which is for reading AV data from the next disk access unit to the HDD 2 via the file system 4.

In this manner, the recording and reproducing apparatus 1 reads AV data from the magnetic disk medium 20 one after another.

As described above, during reading, when an error is created, the recording and reproducing apparatus 1 according to this embodiment increments the read skip counter of the error-bound disk access unit only by 1. As for a disk access unit for which the value of the read skip counter is over 5, the bad DAU flag of this disk access unit is turned on. Meanwhile, reading from a disk access unit whose bad DAU flag is ON is not executed.

Hence, during reading, too, unlike according to the conventional technique, the recording and reproducing apparatus 1 according to this embodiment is capable of continuously transferring AV data without executing replacement processing.

Operations for deletion of AV data which are recorded in the magnetic disk medium 20 will now be described.

AV data which are recorded in the magnetic disk medium 20 are managed as objects. That is, an object refers to AV data from pressing of a record start button of the recording and reproducing apparatus until pressing of a record stop button. During this, a pause button may be used.

Figure 12:
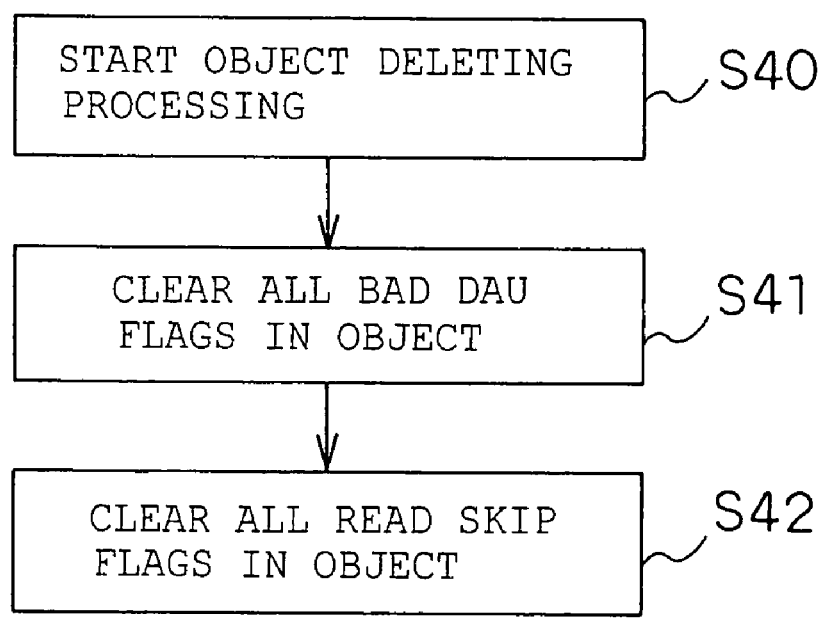
FIG. 12 is a flow chart which shows operations of the recording and reproducing apparatus during deletion of AV data according to the first embodiment of the present invention.
Figure 13:
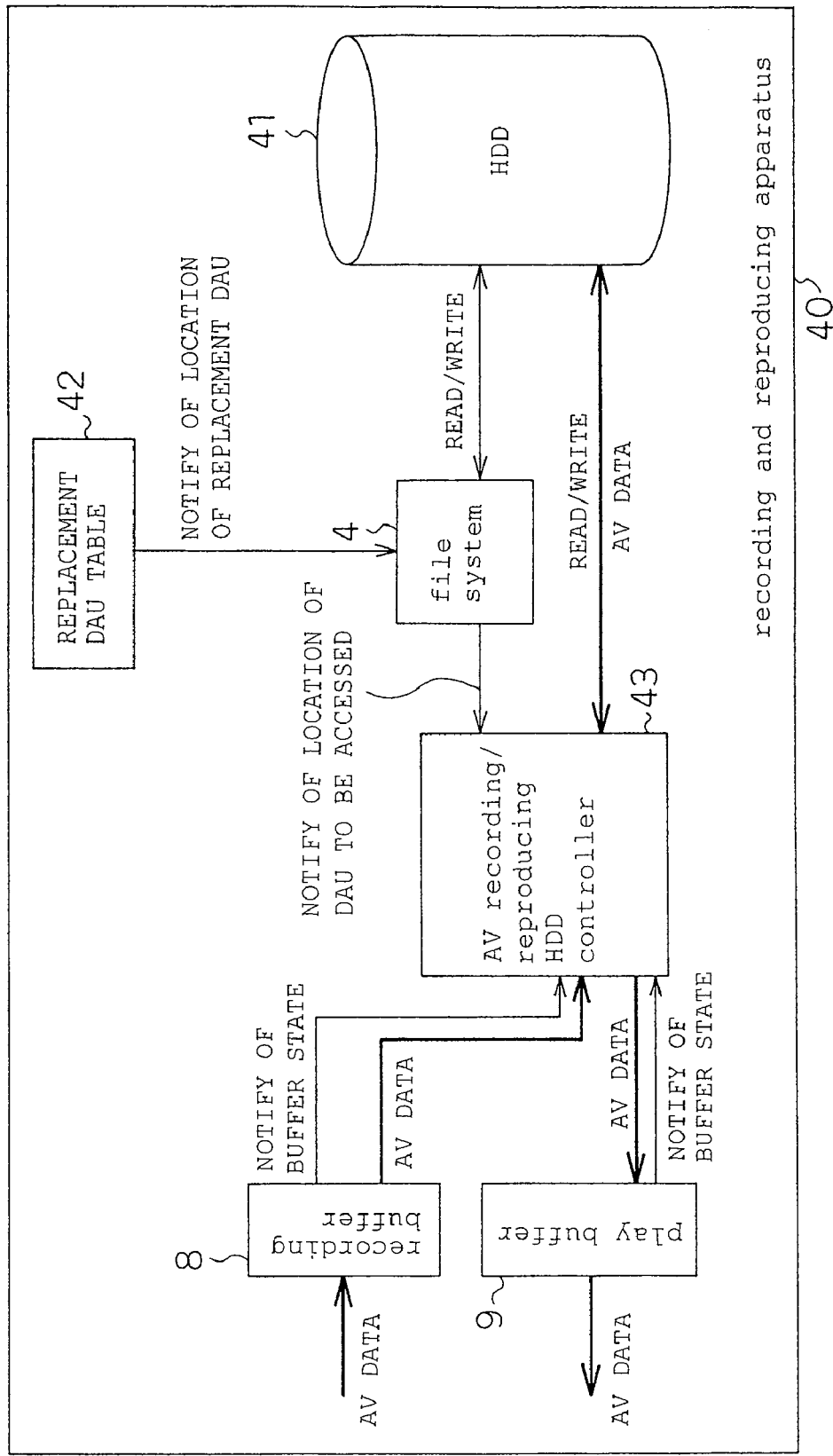
FIG. 13 is a drawing which shows a structure of a conventional recording and reproducing apparatus.
Figure 14:
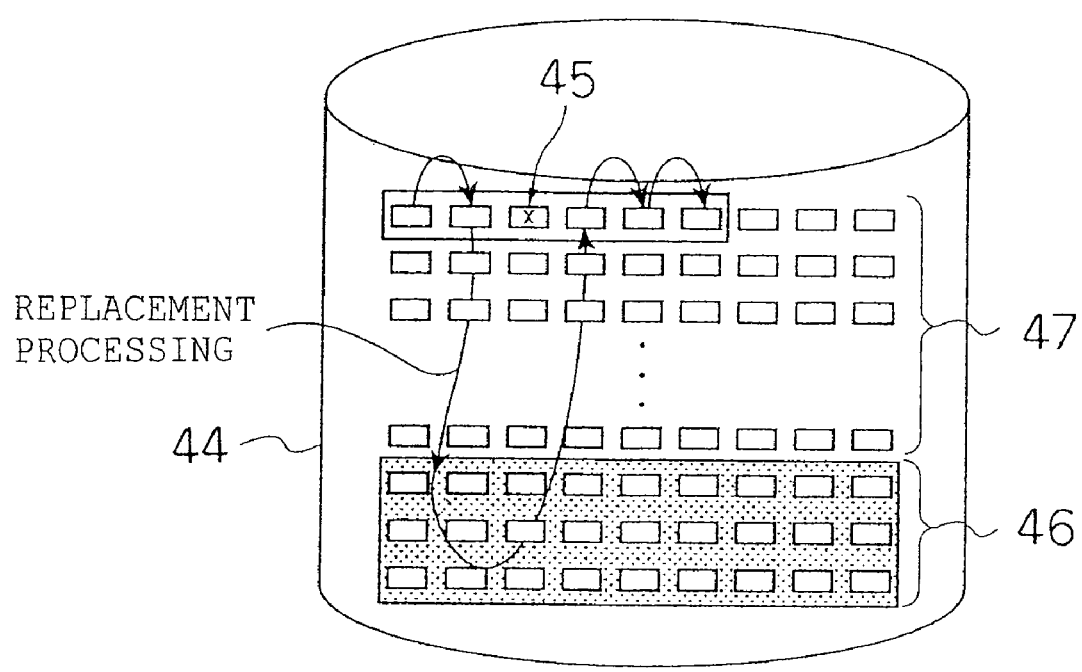

FIG. 12 shows operations for deleting an object which is recorded in the magnetic disk medium 20. A description will now be given with reference to FIG. 12.

At S40, the AV recording/reproducing HDD controller 3 initiates deletion processing. In short, the AV recording/reproducing HDD controller 3 acquires the number assigned to the disk access unit which is to be deleted from the file system 4, and issues a delete command which is for deletion of AV data which are recorded in this disk access unit.

Receiving the delete command, the file system 4 initializes a table which is for associating the file to be deleted with the disk access unit, and writes in the HDD 2.

That is, this table contains the bad DAU flags, the skip counters and the like, and the file system 4 turns off the bad DAU flag (S41) and initializes the read skip counter to zero (S42) during initialization of the table.

The write skip counter of the deleted disk access unit is not initialized and left as it is. Hence, a disk access unit for which the value of the read skip counter is over 5 cannot be re-used even after deletion of AV data. On the contrary, a disk access unit for which the value of the read skip counter is equal to or smaller than 5 becomes re-usable after deletion of AV data.

Figure 6:
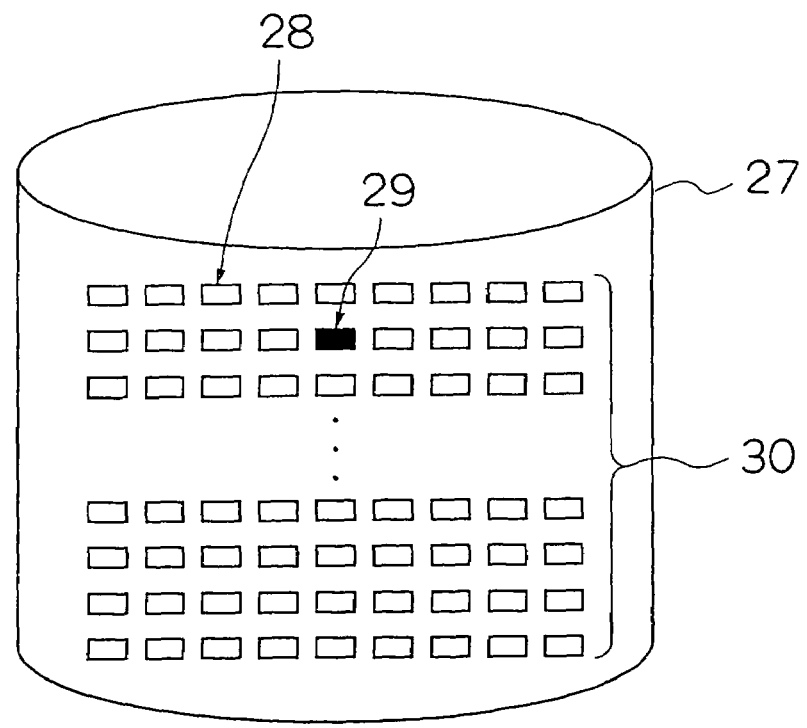
FIG. 6 is a drawing which shows an example of a magnetic disk medium as it is when AV data are deleted according to the first embodiment of the present invention.

FIG. 5 shows a magnetic disk medium as it is before deletion of an object as the magnetic disk medium 20, while FIG. 6 shows a magnetic disk medium as it is after deletion of an object as a magnetic disk medium 30.

An object 0 (24) and an object 1 (25) are recorded in the magnetic disk medium 20. Among disk access units in which the object 0 (24) is recorded are the usable defective DAU 22 for which the value of the read skip counter is equal to or smaller than 5 and the unusable defective DAU 23 for which the value of the read skip counter is over 5.

After deletion of an object, since the value of the write skip counter of the usable defective DAU 22 is equal to or smaller than 5, the value of the read skip counter of the usable defective DAU 22 is initialized to zero and the bad DAU flag of the usable defective DAU 22 is turned off, the usable defective DAU 22 is re-used as denoted at a usable defective DAU 28 which is usable after deletion of an object. On the contrary, since the value of the write skip counter of the usable defective DAU 23 is over 5 even after deletion of an object, the usable defective DAU 23 is not re-used as denoted at an unusable defective DAU 29.

Hence, disturbance such as vibrations will not cause a defect-free disk access unit to be treated as a defective disk access unit permanently, and therefore, it is possible to re-use a defect-free disk access unit.

While the foregoing has described recording of AV data and reproduction of AV data separately, the recording and reproducing apparatus 1 according to this embodiment is capable of reproducing AV data which are recorded in the magnetic disk medium 20 while simultaneously recording AV data. In this manner, for reproduction of already recorded AV data while simultaneously recording AV data, the AV recording/reproducing HDD controller 3, the error monitoring means 6 and the skip processing judging means 5 perform the recording operations and the reproducing operations described above in a time-shared manner.

As described earlier, a method of calculating 300 msec which is the timer over period will now be described.

Assume that the recording and reproducing apparatus 1 according to this embodiment guarantees both the continuity of AV data to be recorded and the continuity of AV data to be reproduced in the event that one wishes to perform simultaneous recording/reproduction which is for reproducing AV data which are recorded in the magnetic disk medium 20 while simultaneously recording AV data, and guarantees the continuity of AV data even when defects occur in disk access units at a probability of 30% both during writing and reading.

Assume that the recording buffer 8 is capable of storing AV data which are equivalent to maximum of three disk access units and the play buffer 9 is likewise capable of storing AV data which are equivalent to maximum of three disk access units.

Assume that time needed to write in or read from a defect-free disk access unit is 160 msec. Assume also that time needed to output or input AV data which are equivalent to one disk access unit is 560 msec.

Under these conditions, 560×3 msec is time needed to store AV data equivalent to three disk access units in the recording buffer 8 or time needed to output AV data equivalent to three disk access units from the play buffer 9. Where the timer over period is Tout, time for reading from three disk access units and writing in three disk access units is 160 msec×3×2+(Tout−160)×3×0.3×2. Since this period must be shorter than the time for storing AV data equivalent to three disk access units in the recording buffer 8 or the time for outputting AV data equivalent to three disk access units from the play buffer 9 in order to guarantee the continuity of AV data, the relationship expressed as Formula 1 below must be satisfied:

$$160\times3\times2+(\text{Tout}-160)\times3\times0.3\times2<560\times3) \quad \text{(Formula 1)}$$

From Formula 1, Tout must satisfy Formula 2 below:

$$\text{Tout}<560 \quad \text{(Formula 2)}$$

Further, the relationship expressed as Formula 3 must be satisfied, in order to guarantee the continuity of AV data in the event that timeout occurs once each during writing and reading when AV data equivalent to three disk access units are written while simultaneously reading AV data equivalent to three disk access units.

$$160 \text{ msec}\times2\times2+\text{Tout}\times2<560\times3 \quad \text{(Formula 3)}$$

From Formula 3, Tout must satisfy Formula 4 below:

$$\text{Tout}<520 \text{ msec} \quad \text{(Formula 4)}$$

Hence, the timer over period needs be set shorter in a situation that timeout occurs once each during writing and reading.

Further, when retry processing, which is for reading from a disk access unit once again, is to be executed only once in response to timeout occurring during reading, Formula 5 must be then satisfied:

$$160 \text{ msec}\times2\times2+\text{Tout}\times3<560\times3 \quad \text{(Formula 5)}$$

From Formula 5, Tout must satisfy following Formula 6.

$$\text{Tout}<347 \text{ msec} \quad \text{(Formula 6)}$$

Hence, when timeover occurs during reading, if reading from that disk access unit is to be permitted only once, the timer over period may be set to 347 msec or shorter. Meanwhile, when Tout is set to 347 msec or shorter, it is possible to satisfy all conditions of Formula 1 through Formula 6.

300 msec which is the timer over period in this embodiment is calculated through the consideration described above.

While the embodiment has been described in relation to the recording and reproducing apparatus 1 which uses the magnetic disk medium 20, the embodiment may be a recording and reproducing apparatus which uses other recording medium.

Figure 2:
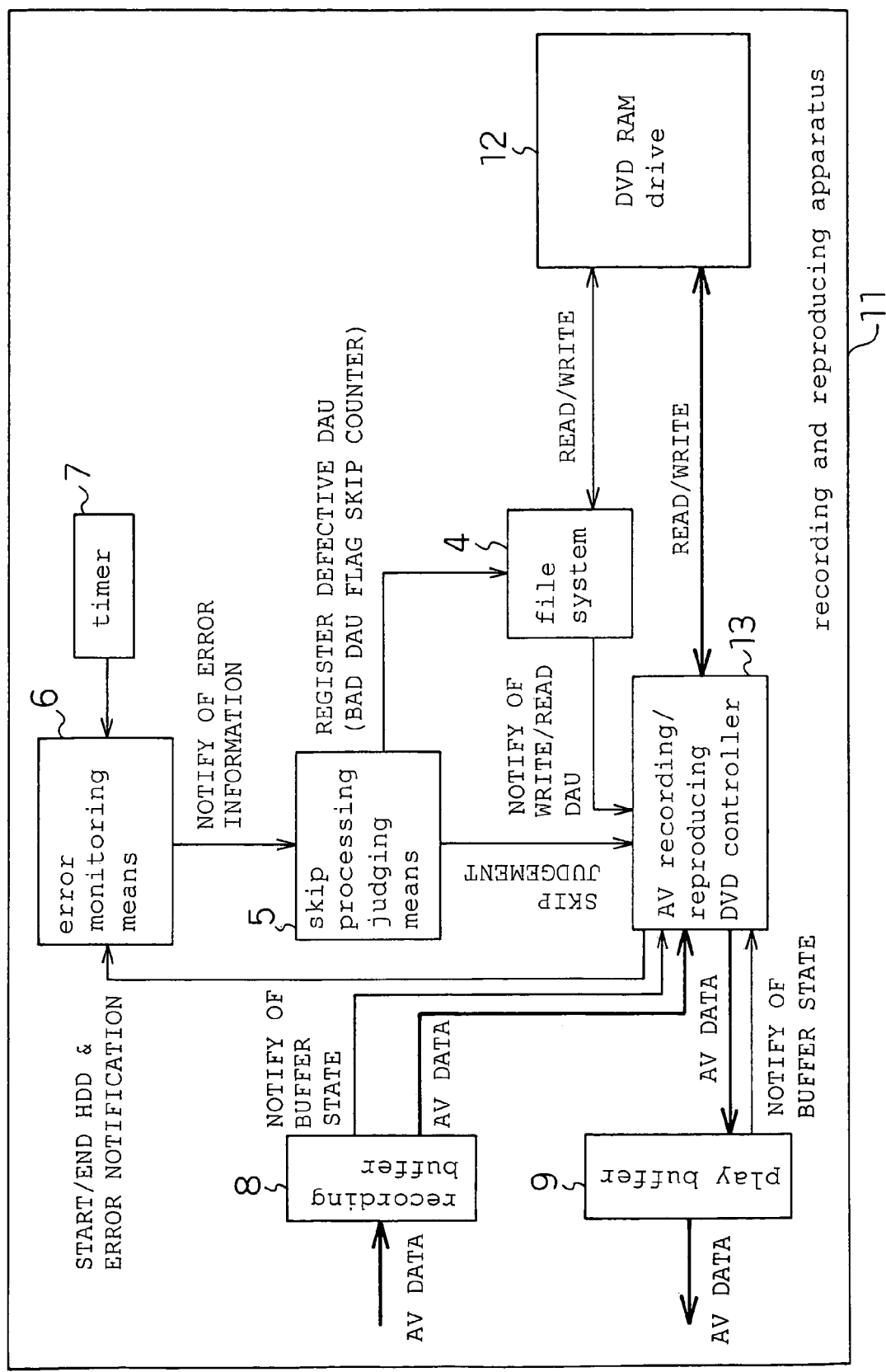
FIG. 2 is a drawing which shows a structure of the recording and reproducing apparatus according to the first embodiment of the present invention for recording in and reproducing from a DVD.

For instance, FIG. 2 shows a recording and reproducing apparatus 11 which uses a DVD RAM as a recording medium. Unlike the recording and reproducing apparatus 1 shown in FIG. 1, the recording and reproducing apparatus 11 comprises an AV recording/reproducing DVD controller 13 and a DVD RAM drive 12. The AV recording/reproducing DVD controller 13 controls the DVD RAM drive 12 like the AV recording/reproducing HDD controller 3 controls the HDD 2. Meanwhile, the file system 4 is similar to the file system of the recording and reproducing apparatus 1 except for that this file system converts the number assigned to a disk access unit into an LBA of a DVD RAM. The other blocks of the recording and reproducing apparatus 11 than those mentioned above are similar to those of the recording and reproducing apparatus 1. Thus, the embodiment may be applied not only to a recording and reproducing apparatus which uses an HDD but to a recording and reproducing apparatus which uses a DVD as well.

Figure 3:
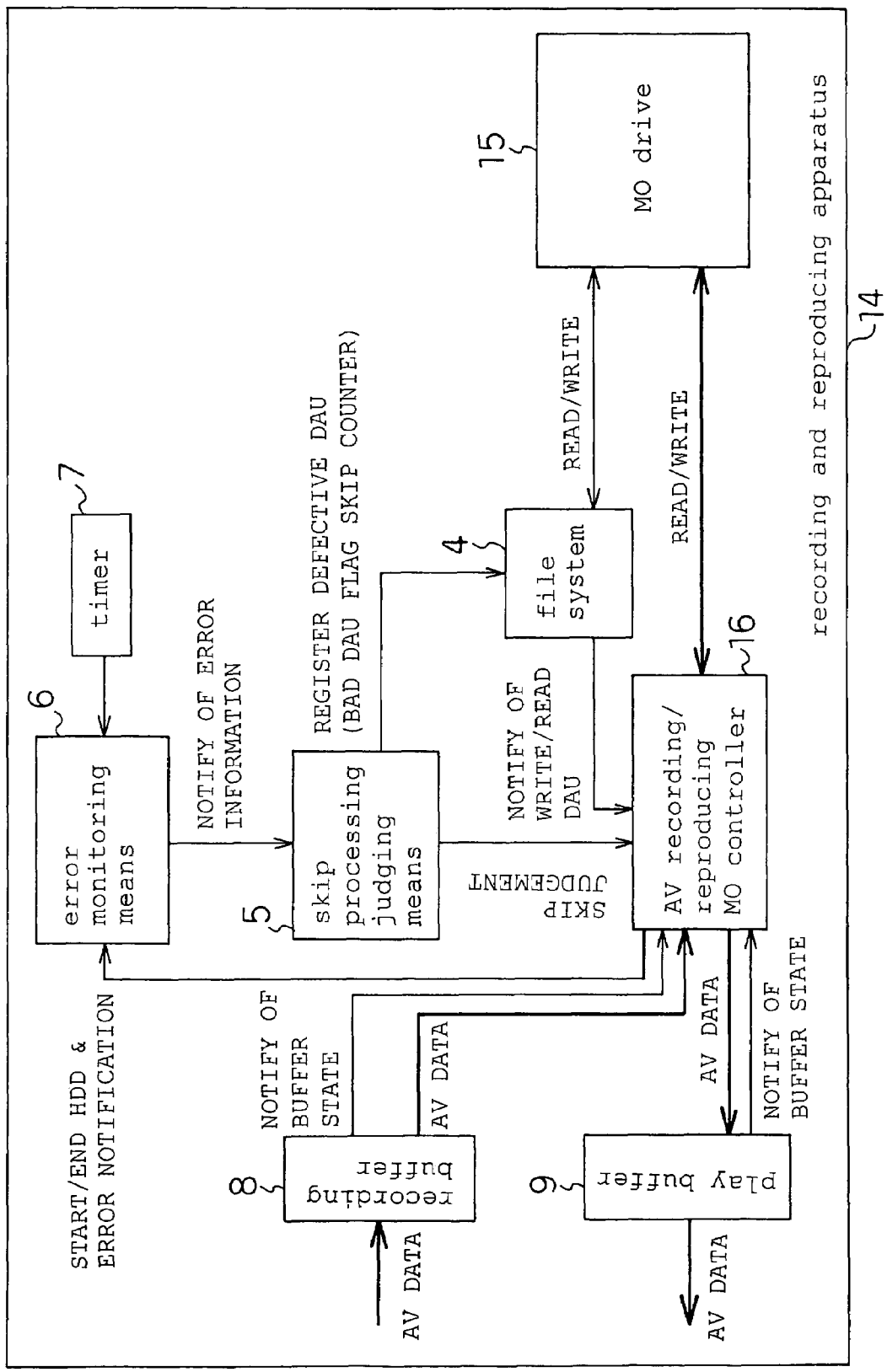
FIG. 3 is a drawing which shows a structure of the recording and reproducing apparatus according to the first embodiment of the present invention for recording in and reproducing from a magneto-optic disk.

FIG. 3 shows a recording and reproducing apparatus 14 which uses a magneto-optic disk as a recording medium. Unlike the recording and reproducing apparatus 1, the recording and reproducing apparatus 14 comprises an AV recording/reproducing MO controller 16 and an MO drive 15. The AV recording/reproducing MO controller 16 controls the MO drive 15 like the AV recording/reproducing HDD controller 3 controls the HDD 2. Meanwhile, the file system 4 is similar to the file system 4 of the recording and reproducing apparatus 1 except for that this file system converts the number assigned to a disk access unit into an LBA of an MO. The other blocks of the recording and reproducing apparatus 14 than those mentioned above are similar to those of the recording and reproducing apparatus 1. Thus, the embodiment may be applied also to a recording and reproducing apparatus which uses a magneto-optic disk.

Further, although this embodiment requires that when a write or read command does not end even after an elapsed time of 300 msec or more since the issuance of the command, the error monitoring means 6 notifies the skip processing judging means 5 of detection of a defective disk access unit, this is not limiting. The error monitoring means 6 may notify the skip processing judging means 5 of detection of a defective disk access unit even in response to occurrence of a command error in an issued write or read command. A command error in this context is an error which the HDD 2 notifies about within 300 msec, which is the timer over period, or in shorter time when the HDD 2 can not execute a write or read command issued to the same for some reason, and such an error occurs in response to an ECC (error correction) error during reading or issuance of a command during initialization of the HDD 2.

A situation that a write error occurs according to the present invention is not limited to a situation that a write command fails to end even after an elapsed time of 300 msec or more since the issuance of the command: A write error referred to in the present invention may be one occurring in a situation that there is a notification of incompetence of the HDD 2 of executing a write command within an elapsed time of 300 msec or less since the issuance of the command, a situation that recording of AV data in a disk access unit fails to complete even after the timer over period which is derived from the continuity of AV data, or a situation that a command error occurs.

Figure 10:
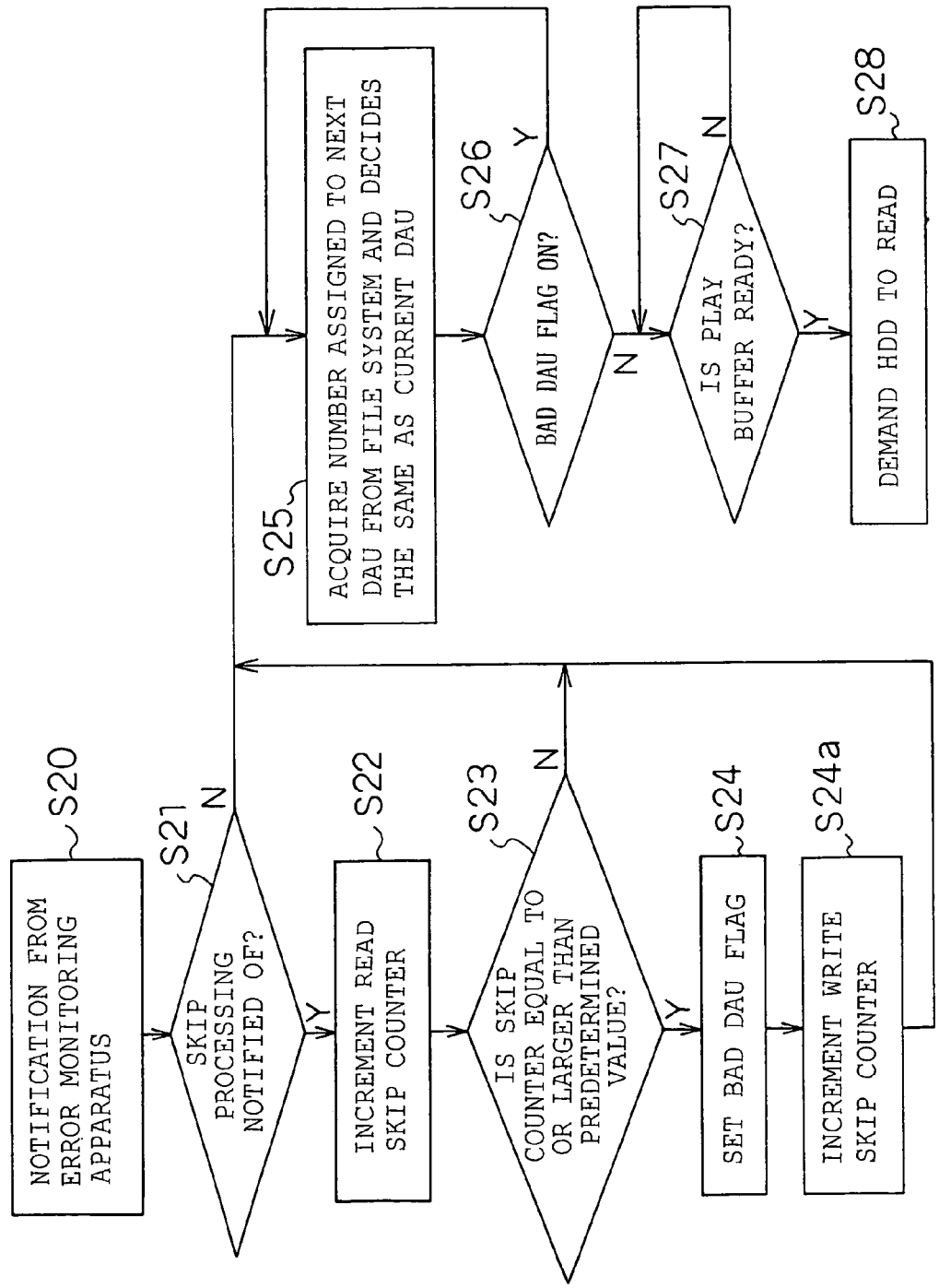
FIG. 10 is another flow chart which shows operations of the skip processing judging means during reproduction according to the first embodiment of the present invention.

Further, although the foregoing has described that the skip processing judging means 5 turns on the bad DAU flag of the disk access unit at S24 in FIG. 9 which shows the embodiment and proceeds to S25, this is not limiting. In other words, as shown in FIG. 10, the skip processing judging means 5 may turn on the bad DAU flag of the disk access unit at S24 and proceed to S24a, and at S24a, the skip processing judging means 5 may increment the write skip counter only by 1 and then proceed to S25. Depending on the specifications of the recording and reproducing apparatus 1, despite a failure to normally write AV data in a disk access unit in reality, it may be judged that the writing has ended normally. In such a case, reading from the disk access unit will always result in an error. Hence, as shown in FIG. 10, execution of S24a after S24 makes it possible to correctly judge whether a disk access unit is permanently defective or not even when it is judged that writing has ended normally despite a failure to normally write AV data in the disk access unit in reality.

SECOND EMBODIMENT

A second embodiment will now be described.

Figure 4:
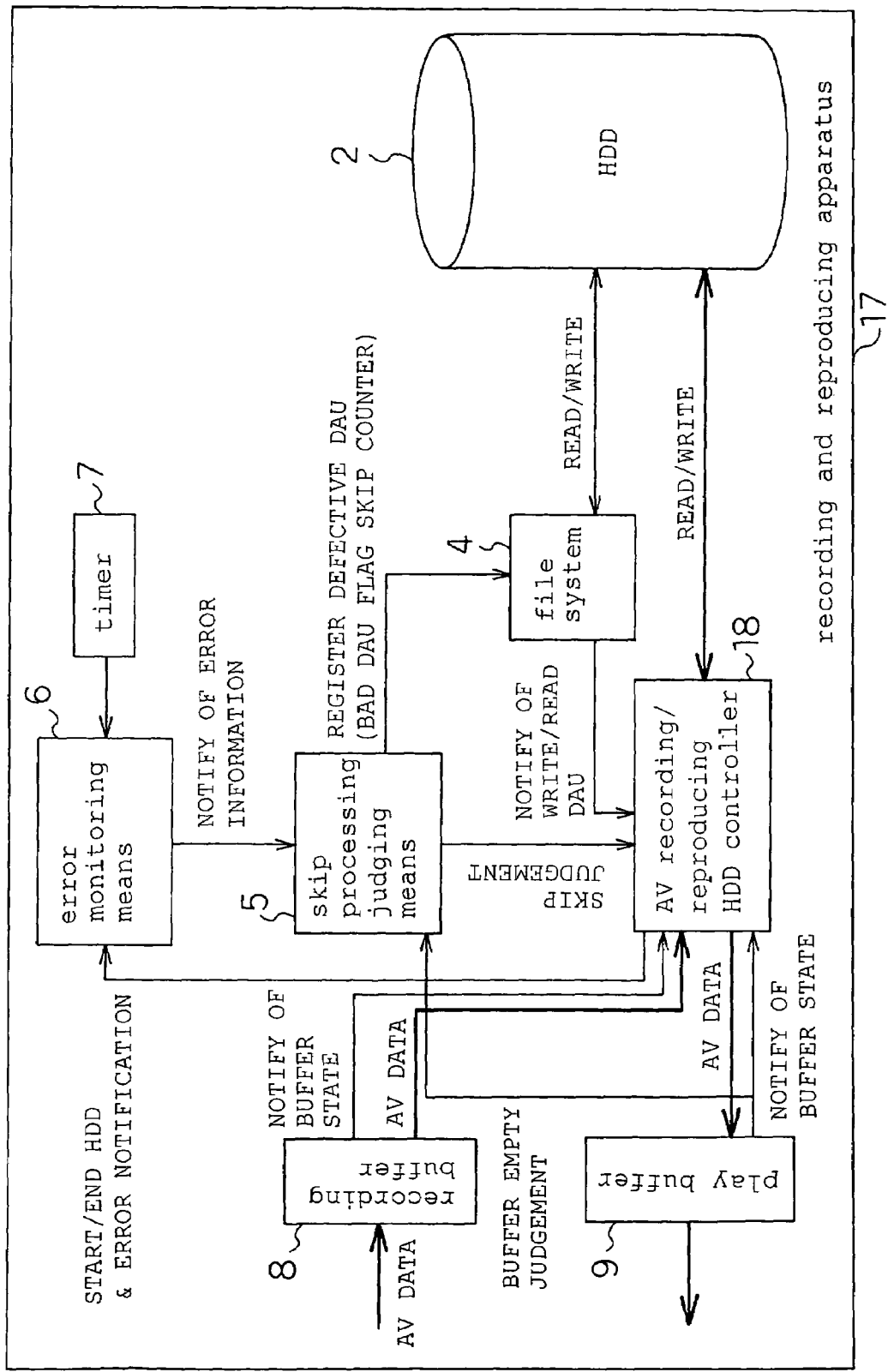
FIG. 4 is a drawing which shows a structure of a recording and reproducing apparatus according to a second embodiment of the present invention.

FIG. 4 shows a recording and reproducing apparatus 17 according to this embodiment.

The recording and reproducing apparatus 17 according to this embodiment comprises a AV recording/reproducing HDD controller 18 instead of the AV recording/reproducing HDD controller 3 of the recording and reproducing apparatus 1 according to the first embodiment.

Unlike the AV recording/reproducing HDD controller 3 according to the first embodiment, the AV recording/reproducing controller HDD 18 is means which controls the HDD 2 so that upon occurrence of an error during reading from a disk access unit, reading from the disk access unit will be repeated until AV data stored in the play buffer 9 have been all outputted.

The others are similar to those according to the first embodiment, and therefore, will not be described again.

Operations according to this embodiment will now be described.

Operations for recording of AV data are similar to those according to the first embodiment.

For reproduction of AV data, as in the first embodiment, the error monitoring means 6 monitors whether an error has occurred during reading.

Figure 11:
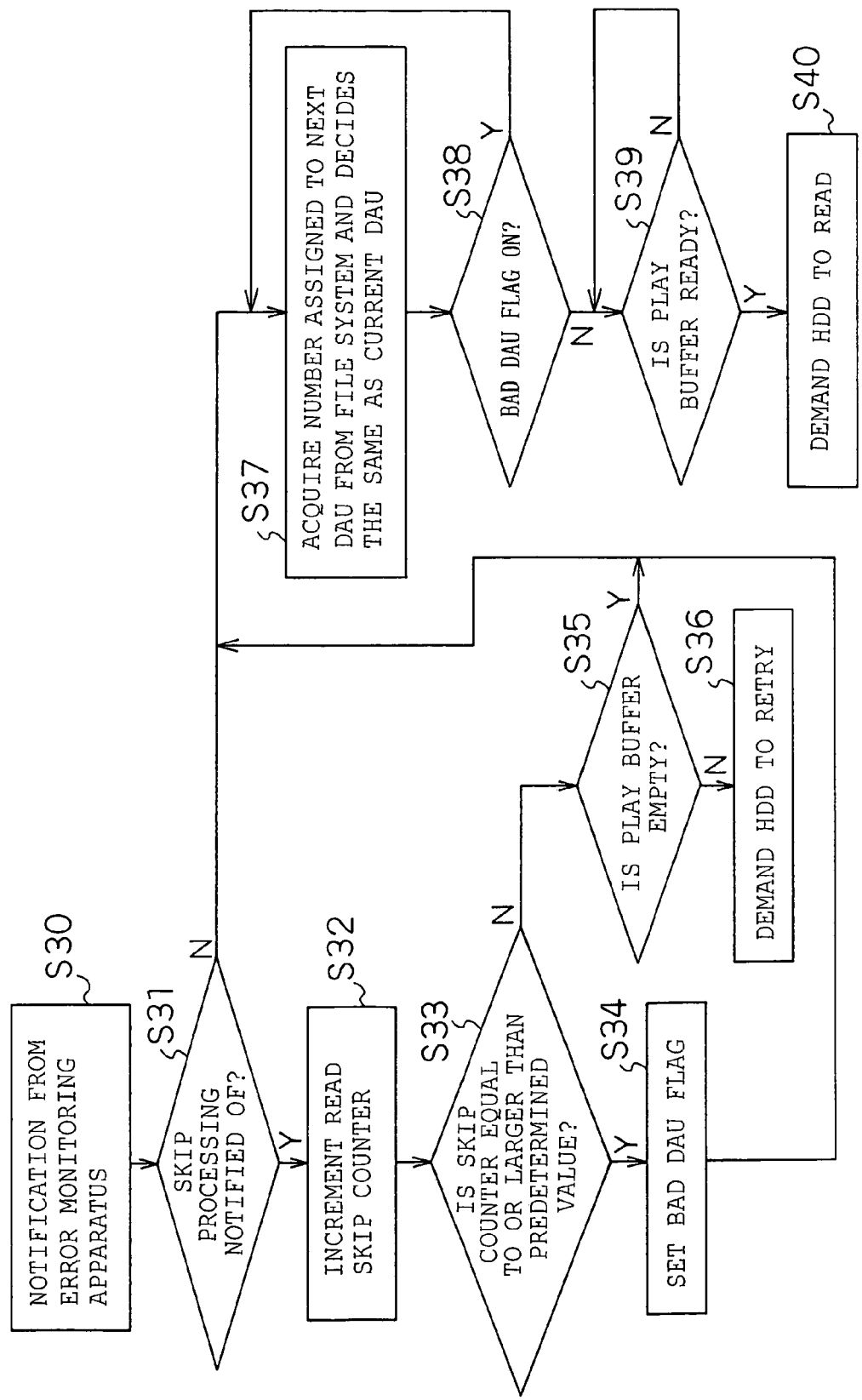
FIG. 11 is a flow chart which shows operations of the skip processing judging means during reproduction according to the second embodiment of the present invention.

FIG. 11 shows operations of the skip processing judging means 5. A description will now be given with reference to FIG. 11.

At S30, when notified by the error monitoring means 6, the skip processing judging means 5 judges whether this notification is a notification of a normal termination of a read command or a notification of detection of a defective disk access unit (S31).

When the notification from the error monitoring means 6 is a notification of a normal termination of a read command, the skip processing judging means 5 proceeds to S37. When the notification is a notification of detection of a defective disk access unit, the skip processing judging means 5 proceeds to S32.

At S32, when notified by the error monitoring means 6 of detection of a defective disk access unit, the skip processing judging means 5 increments the read skip counter of this disk access unit only by 1 and proceeds to S33.

At S33, the skip processing judging means 5 judges whether the value of the read skip counter is over 5. When the value is over 5, the skip processing judging means 5 proceeds to S34, but to S35 when the value is equal to or smaller than 5.

At S35, the skip processing judging means 5 makes an inquiry regarding whether the play buffer 9 is empty to the AV recording/reproducing HDD controller 18. The AV recording/reproducing HDD controller 18, in response to the inquiry from the skip processing judging means 5, checks the state of the play buffer 9 and notifies the skip processing judging means 5 of whether the play buffer 9 is empty. The skip processing judging means 5 proceeds to S37 when the play buffer 9 is empty, but to S36 when the play buffer 9 is not empty.

At S36, the skip processing judging means 5 instructs the AV recording/reproducing HDD controller 18 to read once again from the error-bound disk access unit, and the AV recording/reproducing controller 18, instructed by the skip processing judging means 5, issues a read command which is for reading from this disk access unit once again. The error monitoring means 6 monitors whether an error has occurred during this reading, as in the first embodiment.

At S34, since the value of the read skip counter is over 5, the skip processing judging means 5 turns on the bad DAU flag of the disk access unit and proceeds to S37.

At S37, the skip processing judging means 5 acquires the number assigned to the disk access unit which needs be read next from the file system 4, decides that this is the current disk access unit, and proceeds to S38.

At S38, the skip processing judging means 5 judges whether the bad DAU flag of the current disk access unit is ON or OFF. That is, when the bad DAU flag of the current disk access unit is ON, the skip processing judging means 5 proceeds to S37. On the contrary, when the bad DAU flag of the current disk access unit is OFF, the skip processing judging means 5 notifies the AV recording/reproducing HDD controller 18 of the number assigned to the disk access unit whose bad DAU flag was ON, and proceeds to S39.

At S39, notified by the play buffer 9 of outputting of AV data amounting to a disk access unit, the AV recording/reproducing HDD controller 18 skips the disk access unit which is covered by the notification from the skip processing judging means 5, acquires the number assigned to the disk access unit which needs be written next from the file system 4, and proceeds to S40.

At S40, the AV recording/reproducing HDD controller 18 issues a read command which is for reading AV data from the next disk access unit to the HDD 2 via the file system 4.

In this manner, the recording and reproducing apparatus 17 reads AV data from the magnetic disk medium 20 one after another. Upon occurrence of an error in a disk access unit, reading from the disk access unit will be repeated until the play buffer 9 has been emptied.

Hence, in addition to the effect according to the first embodiment, it is possible to improve the reliability of reproduction of AV data further more than in the first embodiment while continuously reproducing the AV data without a break.

The timer over period in the present invention is not limited to 300 msec as in this embodiment, but may be any period of time, such as 310 msec and 280 msec, which permits to guarantee the continuity of AV data.

The skip counters according to the present invention are not limited to the write skip counter and the read skip counter of the embodiment which are separately disposed for reading and writing, but may be a counter which counts reading and writing altogether. In short, the skip counters according to the present invention may be any skip counter which counts the number of times disk access units are skipped.

Further, the predetermined number of times according to the present invention is not limited to five times as in the embodiment, but may be any number of times, such as four times and seven times, which is appropriate to judge that a disk access unit is permanently unnecessary.

Further, the recording medium in the present invention is not limited to the magnetic disk medium 20 of the embodiment: Rather, the recording medium in the present invention may be any medium, such as a magneto-optic disk and an optical disk medium, which permits to record or reproduce AV data.

Still further, the recording medium in the present invention may be incorporated in the recording and reproducing apparatus according to the present invention or freely attachable and detachable.

In addition, the present invention is directed to a program which operates in co-operation with a computer and which makes the computer execute the functions of all or some means (or apparatuses, elements, circuits, parts, etc.) of the recording and reproducing apparatus according to the present invention described above.

Moreover, the present invention is directed to a medium which can be read on a computer and stores a program, which operates in co-operation with a computer and which makes the computer execute the functions of all or some means of the recording and reproducing apparatus according to the present invention described above, and which makes said program as it is read operates in co-operation with said computer and executes said functions.

In this context, some means (or apparatuses, elements, circuits, parts, etc.) according to the present invention refer to some means among these plurality of means, or some functions in one means.

The present invention also covers a recording medium which stores the program according to the present invention and can be read on a computer.

In one example of use, the program according to the present invention may be recorded in a recording medium which can be read on a computer so that the program operates in co-operation with the computer.

In one example of use, the program according to the present invention may be transmitted through a transmission medium and read by a computer so that the program operates in co-operation with the computer.

The recording medium includes a ROM, etc., whereas the transmission medium includes a transmission medium such as the Internet, light, an electric wave, a sound wave, etc.

As described above, the computer referred to in the present invention is not limited to pure hardware such as a CPU but may include firmware, OS, and further, peripheral equipment.

As described above, the structure according to the present invention may be realized by software or hardware.

As described clearly above, the present invention provides, a recording and reproducing apparatus, a recording and reproducing method, a medium and a program with which it is possible to continuously transfer AV data without a break without taking labor and time.

In addition, the present invention provides a recording and reproducing apparatus, a medium and a program with which it is possible to continuously transfer AV data without deleting AV data which have already been recorded in a recording medium.

Further, the present invention provides a recording and reproducing apparatus, a medium and a program with which it is possible to continuously transfer AV data without decreasing an area which a user can freely use.

Still further, the present invention provides a recording and reproducing apparatus, a medium and a program with which it is possible to avoid permanently treating a defect-free disk access unit as a defective disk access unit due to disturbance such as vibrations and to accordingly re-use a defect-free disk access unit.

The invention is:

1. A recording and reproducing apparatus, comprising:
recording means which writes AV data in or reads AV data from a recording medium having a predetermined format;
recording control means which, when there is a write error in writing of AV data in a disk access unit which is a minimum unit for continuously accessing said recording medium, controls said recording means such that this disk access unit will be skipped and said AV data will be written in the next disk access unit,
wherein a replacement area which corresponds to said disk access unit in which there is said error is not formed in said recording medium,
error judging means which makes a judgment regarding whether said write error has occurred,
wherein said recording control means controls said recording means based on said judgment, and
wherein said error judging means judges that said write error or said read error has occurred when even after a timer over period derived from the continuity of AV data has passed, writing or reading of said AV data in said disk access unit fails to complete; and
a write skip counter which counts the number of times that said disk access unit is skipped.
wherein said recording control means controls such that when said number of times exceeds a predetermined value which is equal to or larger than 1, this disk access unit will not be used after this, and
wherein the number of times counted by said write skip counter is not initialized unless said recording medium conforms to the predetermined format.

2. The recording and reproducing apparatus of claim 1, wherein when writing or reading of said AV data in said disk access unit fails to complete even after said timer over period, said recording control means forcibly terminates a command issued to said recording means and accordingly controls such that said disk access unit will be skipped.

3. A recording and reproducing apparatus, comprising:
recording means which writes AV data in or reads AV data from a recording medium having a predetermined format;
recording control means which, when there is a write error in writing of AV data in a disk access unit which is a minimum unit for continuously accessing said recording medium, controls said recording means such that this disk access unit will be skipped and said AV data will be written in the next disk access unit,
wherein a replacement area which corresponds to said disk access unit in which there is said error is not formed in said recording medium,
error judging means which makes a judgment regarding whether said write error has occurred,
wherein said recording control means controls said recording means based on said judgment,
wherein said error judging means makes a judgment regarding whether there is a read error in reading of AV data from said disk access unit,
when there is a read error in reading of AV data in said disk access unit, said recording control means controls said recording means based on said judgment such that this disk access unit will be skipped and AV data will be read from the next disk access unit, and wherein said error judging means judges that said write error or said read error has occurred when even after a timer over period derived from the continuity of AV data has passed, writing or reading of said AV data in said disk access unit fails to complete; and
a write skip counter which counts the number of times that said disk access unit is skipped,
wherein said recording control means controls such that when said number of times exceeds a predetermined value which is equal to or larger than 1, this disk access unit will not be used after this, and
wherein the number of times counted by said write skip counter is not initialized unless said recording medium conforms to the predetermined format.

4. The recording and reproducing apparatus of claim 3, wherein when writing or reading of said AV data in said disk access unit fails to complete even after said timer over period, said recording control means forcibly terminates a command issued to said recording means and accordingly controls such that said disk access unit will be skipped.

5. A recording and reproducing apparatus, comprising:
recording means which writes AV data in or reads AV data from a recording medium having a predetermined format;
recording control means which, when there is a write error in writing of AV data in a disk access unit which is a minimum unit for continuously accessing said recording medium, controls said recording means such that this disk access unit will be skipped and said AV data will be written in the next disk access unit,
wherein a replacement area which corresponds to said disk access unit in which there is said error is not formed in said recording medium; and
a write skip counter which counts the number of times that said disk access unit is skipped,
wherein said recording control means controls such that when said number of times exceeds a predetermined value which is equal to or larger than 1, this disk access unit will not be used after this, and
wherein the number of times counted by said write skip counter is not initialized unless said recording medium conforms to the predetermined format.

6. A recording and reproducing apparatus, comprising:
recording means which writes AV data in or reads AV data from a recording medium having a predetermined format;
recording control means which, when there is a write error in writing of AV data in a disk access unit which is a minimum unit for continuously accessing said recording medium, controls said recording means such that this disk access unit will be skipped and said AV data will be written in the next disk access unit,
wherein a replacement area which corresponds to said disk access unit in which there is said error is not formed in said recording medium,
a read protection flag which expresses whether to prohibit reading from said disk access unit, and
wherein when said read protection flag which corresponds to said disk access unit is ON, said recording control means controls such that reading from this disk access unit will not be executed, but
controls such that reading from this disk access unit will be executed when said read protection flag which corresponds to said disk access unit is OFF;
a read skip counter which counts the number of times that a read error has occurred during reading of said AV data from said disk access unit, wherein when said number of times exceeds a predetermined value, said recording control means turns on said read protection flag which corresponds to said disk access unit; and a write skip counter which counts the number of times that said disk access unit is skipped, wherein said recording control means controls such that when said number of times exceeds a predetermined value which is equal to or larger than 1, this disk access unit will not be used after this, and wherein the number of times counted by said write skip counter is not initialized unless said recording medium conforms to the predetermined format.

7. The recording and reproducing apparatus of claim 6, wherein when writing of said AV data in said disk access unit has ended normally, said recording control means turns off said read protection flag which corresponds to said disk access unit, and the value of said read skip counter which corresponds to said disk access unit is initialized to zero.

8. The recording and reproducing apparatus of claim 6, wherein when said AV data recorded in said disk access unit are deleted, said recording control means turns off said read protection flag which corresponds to said disk access unit, and the value of said read skip counter which corresponds to said disk access unit is initialized.

9. A recording and reproducing method, comprising:

a recording step of writing AV data in or reading AV data from a recording medium having a predetermined format;

a recording control step of, when there is a write error in writing of AV data in a disk access unit which is a minimum unit for continuously accessing said recording medium, controlling said recording step such that this disk access unit will be skipped and said AV data will be written in the next disk access unit, wherein a replacement area which corresponds to said disk access unit in which there is said error is not formed in said recording medium;

an error judging step of making a judgment regarding whether said write error has occurred, wherein said recording control step controls said recording step based on said judgment, and wherein said error judging step judges that said write error or said read error has occurred when even after a timer over period derived from the continuity of AV data has passed, writing or reading of said AV data in said disk access unit fails to complete; and a write skin counter which counts the number of times that said disk access unit is skipped, wherein said recording control means controls such that when said number of times exceeds a predetermined value which is equal to or larger than 1, this disk access unit will not be used after this, and wherein the number of times counted by said write skip counter is not initialized unless said recording medium conforms to the predetermined format.

10. A recording and reproducing method, comprising:

a recording step of writing AV data in or reading AV data from a recording medium having a predetermined format;

a recording control step of, when there is a write error in writing of AV data in a disk access unit which is a minimum unit for continuously accessing said recording medium, controlling said recording step such that this disk access unit will be skipped and said AV data will be written in the next disk access unit, wherein a replacement area which corresponds to said disk access unit in which there is said error is not formed in said recording medium;

an error judging step of making a judgment regarding whether said write error has occurred, wherein said recording control step controls said recording step based on said judgment, wherein said error judging step makes a judgment regarding whether there is a read error in reading of AV data from said disk access unit is judged, when there is a read error in reading of AV data in said disk access unit, said recording control step controls said recording means based on said judgment such that this disk access unit will be skipped and AV data will be read from the next disk access unit, and wherein said error judging step judges that said write error or said read error has occurred when even after a timer over period derived from the continuity of AV data has passed, writing or reading of said AV data in said disk access unit fails to complete; and a write skip counter which counts the number of times that said disk access unit is skipped, wherein said recording control means controls such that when said number of times exceeds a predetermined value which is equal to or larger than 1, this disk access unit will not be used after this, and wherein the number of times counted by said write skip counter is not initialized unless said recording medium conforms to the predetermined format.

* * * * *

UNITED STATES PATENT AND TRADEMARK OFFICE
CERTIFICATE OF CORRECTION

PATENT NO. : 7,346,265 B2 Page 1 of 1
APPLICATION NO. : 10/415605
DATED : March 18, 2008
INVENTOR(S) : Takigawa et al.

It is certified that error appears in the above-identified patent and that said Letters Patent is hereby corrected as shown below:

On the title page item (54) and col. 1, line 1, "RECORDING/REPRODUCING APPARATUS, RECORDING/REPRODUCING METHOD, MEDIUM, AND PROGRAM" should read --RECORDING AND REPRODUCING APPARATUS, RECORDING AND REPRODUCING METHOD, MEDIUM, AND PROGRAM--

At Column 27, line 50, "a write skin" should read --a write skip--

Signed and Sealed this

Twelfth Day of August, 2008

JON W. DUDAS
*Director of the United States Patent and Trademark Office*